US012383980B2

(12) United States Patent
Matsumoto et al.

(10) Patent No.: US 12,383,980 B2
(45) Date of Patent: Aug. 12, 2025

(54) WELDING METHOD, WELDING DEVICE, METAL STACKED BODY, ELECTRICAL COMPONENT, AND ELECTRICAL PRODUCT

(71) Applicant: FURUKAWA ELECTRIC CO., LTD., Tokyo (JP)

(72) Inventors: Nobuyasu Matsumoto, Tokyo (JP); Fumika Nishino, Tokyo (JP); Masamitsu Kaneko, Tokyo (JP); Kazuyuki Umeno, Tokyo (JP); Jun Terada, Tokyo (JP); Daeyoul Yoon, Tokyo (JP); Tomomichi Yasuoka, Tokyo (JP); Sayo Suga, Tokyo (JP); Toshiaki Sakai, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/060,718

(22) Filed: Dec. 1, 2022

(65) Prior Publication Data

US 2023/0101343 A1 Mar. 30, 2023

Related U.S. Application Data

(63) Continuation of application No. PCT/JP2021/021452, filed on Jun. 4, 2021.

(30) Foreign Application Priority Data

Jun. 4, 2020 (JP) ................................. 2020-097703

(51) Int. Cl.
*B23K 26/244* (2014.01)
*B23K 26/06* (2014.01)
(Continued)

(52) U.S. Cl.
CPC ........ *B23K 26/244* (2015.10); *B23K 26/0613* (2013.01); *B23K 26/067* (2013.01);
(Continued)

(58) Field of Classification Search
CPC .. B23K 26/244; B23K 26/0613; B23K 26/32; B23K 26/21; H01M 50/566; B32B 15/01; G02B 26/105
(Continued)

(56) References Cited

U.S. PATENT DOCUMENTS

2016/0082546 A1* 3/2016 Burbaum ............... B23K 26/60
219/121.76
2018/0333918 A1* 11/2018 Sohn .................... B23K 26/127
(Continued)

FOREIGN PATENT DOCUMENTS

CN 110402179 A 11/2019
JP 10-180469 A 7/1998
(Continued)

OTHER PUBLICATIONS

Japanese Office Action issued Jan. 31, 2024 in Japanese Patent Application No. 2023-701172 (with unedited computer-generated English translation), 28 pages.
(Continued)

*Primary Examiner* — Eric S Stapleton
*Assistant Examiner* — Yeong Juen Thong
(74) *Attorney, Agent, or Firm* — Oblon, McClelland, Maier & Neustadt, L.L.P.

(57) ABSTRACT

A welding method includes: irradiating a plurality of metal foils stacked on a first surface of a metal member in a first direction with laser light to weld the metal member and the plurality of metal foils to each other, the laser light including first laser light having a wavelength of 800 [nm] or more and 1200 [nm] or less and second laser light having a wavelength
(Continued)

of 550 [nm] or less, a second surface of a metal foil farthest from the metal member in the first direction among the plurality of metal foils, on a side opposite to the metal member, being irradiated with the laser light.

13 Claims, 12 Drawing Sheets

(51) Int. Cl.
*B23K 26/067* (2006.01)
*B23K 26/21* (2014.01)
*B23K 26/32* (2014.01)
*B32B 15/01* (2006.01)
*G02B 26/10* (2006.01)
*H01M 50/566* (2021.01)

(52) U.S. Cl.
CPC .............. *B23K 26/32* (2013.01); *B32B 15/01* (2013.01); *H01M 50/566* (2021.01); *B23K 26/21* (2015.10); *G02B 26/105* (2013.01)

(58) Field of Classification Search
USPC ............................. 219/121.64, 121.14, 137 R
See application file for complete search history.

(56) References Cited

U.S. PATENT DOCUMENTS

| | | |
|---|---|---|
| 2019/0389001 A1 | 12/2019 | Yasuoka et al. |
| 2021/0299785 A1* | 9/2021 | Närhi ................. B23K 26/22 |
| 2022/0199566 A1* | 6/2022 | Fuji ................. H01L 23/3107 |

FOREIGN PATENT DOCUMENTS

| | | | |
|---|---|---|---|
| JP | | 2004-025284 A | 1/2004 |
| JP | WO | 2010/131298 A1 | 11/2010 |
| JP | | 2011-212711 A | 10/2011 |
| JP | | 2011-224655 A | 11/2011 |
| JP | | 2012-110905 A | 6/2012 |
| JP | | 2014-161862 A | 9/2014 |
| JP | | 2015-163412 A | 9/2015 |
| JP | | 2015-217422 A | 12/2015 |
| JP | | 2018-187660 A | 11/2018 |
| JP | | 2019-5769 A | 1/2019 |
| JP | | 2019-67570 A | 4/2019 |
| JP | | 2020-004643 A | 1/2020 |
| JP | | 2020-17483 A | 1/2020 |
| WO | WO | 2018/159857 A1 | 9/2018 |

OTHER PUBLICATIONS

Japanese Office Action issued May 31, 2024 in Japanese Patent Application No. 2022-211139 (with machine-generated English translation), 33 pages.
Japanese Office Action issued May 31, 2024 in Japanese Patent Application No. 2022-211277 (with machine-generated English translation), 31 pages.
Japanese Office Action issued May 31, 2024 in Japanese Patent Application No. 2022-212256 (with machine-generated English translation), 33 pages.
International Search Report issued Aug. 24, 2021 in PCT/JP2021/021452 filed on Jun. 4, 2021, 5 pages.
Takeda, Susumu, "The Trend of High Power Direct Diode Laser and The Application", Journal of Japan Laser Processing Society, vol. 26, No. 3, Oct. 2019, (with partial unedited computer-generated English translation), 13 pages.
Korean Office Action issued Aug. 28, 2024 in Korean Patent Application No. 10-2022-7042153 (with unedited, machine-generated English translation), 15 pages.
Chinese Office Action dated Mar. 29, 2025, issued in Chinese Patent Application No. 202180039511.2 (with English translation).

* cited by examiner

WELDING METHOD, WELDING DEVICE, METAL STACKED BODY, ELECTRICAL COMPONENT, AND ELECTRICAL PRODUCT

CROSS-REFERENCE TO RELATED APPLICATION(S)

This application is a continuation of International Application No. PCT/JP2021/021452, filed on Jun. 4, 2021 which claims the benefit of priority of the prior Japanese Patent Application No. 2020-097703, filed on Jun. 4, 2020, the entire contents of which are incorporated herein by reference.

BACKGROUND

1. Technical Field

The present invention relates to a welding method, a welding device, a metal stacked body, an electrical component, and an electrical product.

2. Related Art

In the related art, there is a battery in which a plurality of tabs and terminals are joined to each other by laser welding (for example, JP 2020-4643 A).

In this type of welding, it is important not only to ensure a required joining strength but also to prevent generation of welding defects such as spatters and blowholes in a workpiece.

Therefore, it is desired, for example, to obtain a new and improved welding method and welding device capable of welding a stacked body in which a plurality of metal foils and a metal member are superimposed on each other, and a metal stacked body, an electrical component, and an electrical product welded by the welding method or the welding device.

SUMMARY

In some embodiments, a welding method includes: irradiating a plurality of metal foils stacked on a first surface of a metal member in a first direction with laser light to weld the metal member and the plurality of metal foils to each other, the laser light including first laser light having a wavelength of 800 [nm] or more and 1200 [nm] or less and second laser light having a wavelength of 550 [nm] or less, a second surface of a metal foil farthest from the metal member in the first direction among the plurality of metal foils, on a side opposite to the metal member, being irradiated with the laser light.

In some embodiments, provided is a welding device configured to weld a metal member and a plurality of metal foils to each other. The welding device includes: a laser oscillator; and an optical head configured to irradiate the plurality of metal foils stacked on a first surface of the metal member in a first direction with laser light from the laser oscillator, the laser light including first laser light having a wavelength of 800 [nm] or more and 1200 [nm] or less and second laser light having a wavelength of 500 [nm] or less, the optical head being configured to irradiate a second surface of a metal foil farthest from the metal member in the first direction among the plurality of metal foils, on a side opposite to the metal member, with the laser light.

In some embodiments, a metal stacked body includes: a metal member including a first surface; a plurality of metal foils stacked on the first surface in a first direction; and a welded portion where the metal member and the plurality of metal foils are welded to each other, the welded portion including: a weld metal extending toward the metal member from a second surface of a metal foil farthest from the metal member in the first direction among the plurality of metal foils, on a side opposite to the metal member; and a thermally affected portion located around the weld metal, and the weld metal has a first portion and a second portion in which an average value of cross-sectional areas of crystal grains in a cross section along the first direction is larger than an average value of cross-sectional areas of crystal grains of the first portion in the cross section along the first direction.

In some embodiments, a metal stacked body includes: a metal member; and a plurality of metal foils stacked on the metal member, the metal stacked body including a first surface on a side opposite to the metal member, a second surface on a back side of the first surface, and a welded portion extending along the first surface, the welded portion including: a weld metal extending from the first surface toward the second surface; and a thermally affected portion located around the weld metal. When a first grain boundary number ratio is expressed by the following formula (3-1), $$Rb1 = N12/N11 \qquad (3\text{-}1)$$

Rb1 represents a first grain boundary number ratio, N11 represents the number of grain boundaries intersecting with a linear test line having a predetermined length along the first surface in a test cross section orthogonal to the first surface and in the test cross section along an extending direction of the welded portion, and N12 represents the number of grain boundaries intersecting with a linear test line having the predetermined length extending in a direction orthogonal to the first surface in the test cross section, the weld metal includes a third portion located away from the first surface in a thickness direction directed from the first surface to the second surface, and a fourth portion located between the third portion and the first surface, the first grain boundary number ratio of the fourth portion being lower than the first grain boundary number ratio of the third portion.

In some embodiments, a metal stacked body includes: a metal member; and a plurality of metal foils stacked on the metal member, the metal stacked body including a first surface on a side opposite to the metal member, a second surface on a back side of the first surface, and a welded portion extending along the first surface, the welded portion including: a weld metal extending from the first surface toward the second surface; and a thermally affected portion located around the weld metal. When a second grain boundary number ratio is expressed by the following formula (3-2), $$Rb2 = \max(N22/N21, N21/N22) \qquad (3\text{-}2)$$

Rb2 represents a second grain boundary number ratio, N21 represents the number of grain boundaries intersecting with a linear test line having a predetermined length, extending in a first direction between a direction along the first surface and a direction orthogonal to the first surface in a test cross section orthogonal to the first surface and in the test cross section along an extending direction of the welded portion, N22 represents the number of grain boundaries intersecting with a linear test line having the predetermined length extending in a second direction orthogonal to the first direction in the test cross section, and max (N22/N21, N21/N22) is (N22/N21) in a case where (N22/N21) is (N21/N22) or more, and max (N22/N21, N21/N22) is (N21/N22) in a case where (N22/N21) is less than (N21/N22), the weld metal includes a third portion located away from the first surface in a thickness direction directed from the first surface to the second surface, and a fourth portion located between the third portion and the first surface, the second grain boundary number ratio of the fourth portion being higher than the second grain boundary number ratio of the third portion.

In some embodiments, a metal stacked body includes: a metal member; and a plurality of metal foils stacked on the metal member, the metal stacked body including a first surface on a side opposite to the metal member, a second surface on a back side of the first surface, and a welded portion extending along the first surface, the welded portion including: a weld metal extending from the first surface toward the second surface; and a thermally affected portion located around the weld metal. When a first grain boundary number ratio is expressed by the following formula (3-1), $$Rb1 = N12/N11 \tag{3-1}$$

Rb1 represents a first grain boundary number ratio, N11 represents the number of grain boundaries intersecting with a linear test line having a predetermined length along the first surface in a test cross section orthogonal to the first surface and in the test cross section along an extending direction of the welded portion, and N12 represents the number of grain boundaries intersecting with a linear test line having the predetermined length extending in a direction orthogonal to the first surface in the test cross section, and a second grain boundary number ratio Rb2 is expressed by the following formula (3-2), $$Rb2 = \max(N22/N21, N21/N22) \tag{3-2}$$

Rb2 represents a second grain boundary number ratio, N21 represents the number of grain boundaries intersecting with a linear test line having a predetermined length, extending in a first direction between a direction along the first surface and a direction orthogonal to the first surface in a test cross section orthogonal to the first surface and in the test cross section along an extending direction of the welded portion, N22 represents the number of grain boundaries intersecting with a linear test line having the predetermined length extending in a second direction orthogonal to the first direction in the test cross section, and max (N22/N21, N21/N22) is (N22/N21) in a case where (N22/N21) is (N21/N22) or more, and max (N22/N21, N21/N22) is (N21/N22) in a case where (N22/N21) is less than (N21/N22), the weld metal includes a third portion located away from the first surface in a thickness direction directed from the first surface to the second surface, and a fourth portion located between the third portion and the first surface, the first grain boundary number ratio of the fourth portion being lower than the first grain boundary number ratio of the third portion, the second grain boundary number ratio of the fourth portion being higher than the second grain boundary number ratio of the third portion.

In some embodiments, an electrical component includes the metal stacked body as a conductor.

In some embodiments, an electrical product includes the metal stacked body as a conductor.

The above and other objects, features, advantages and technical and industrial significance of this invention will be better understood by reading the following detailed description of presently preferred embodiments of the invention, when considered in connection with the accompanying drawings.

DETAILED DESCRIPTION

Figure 1:
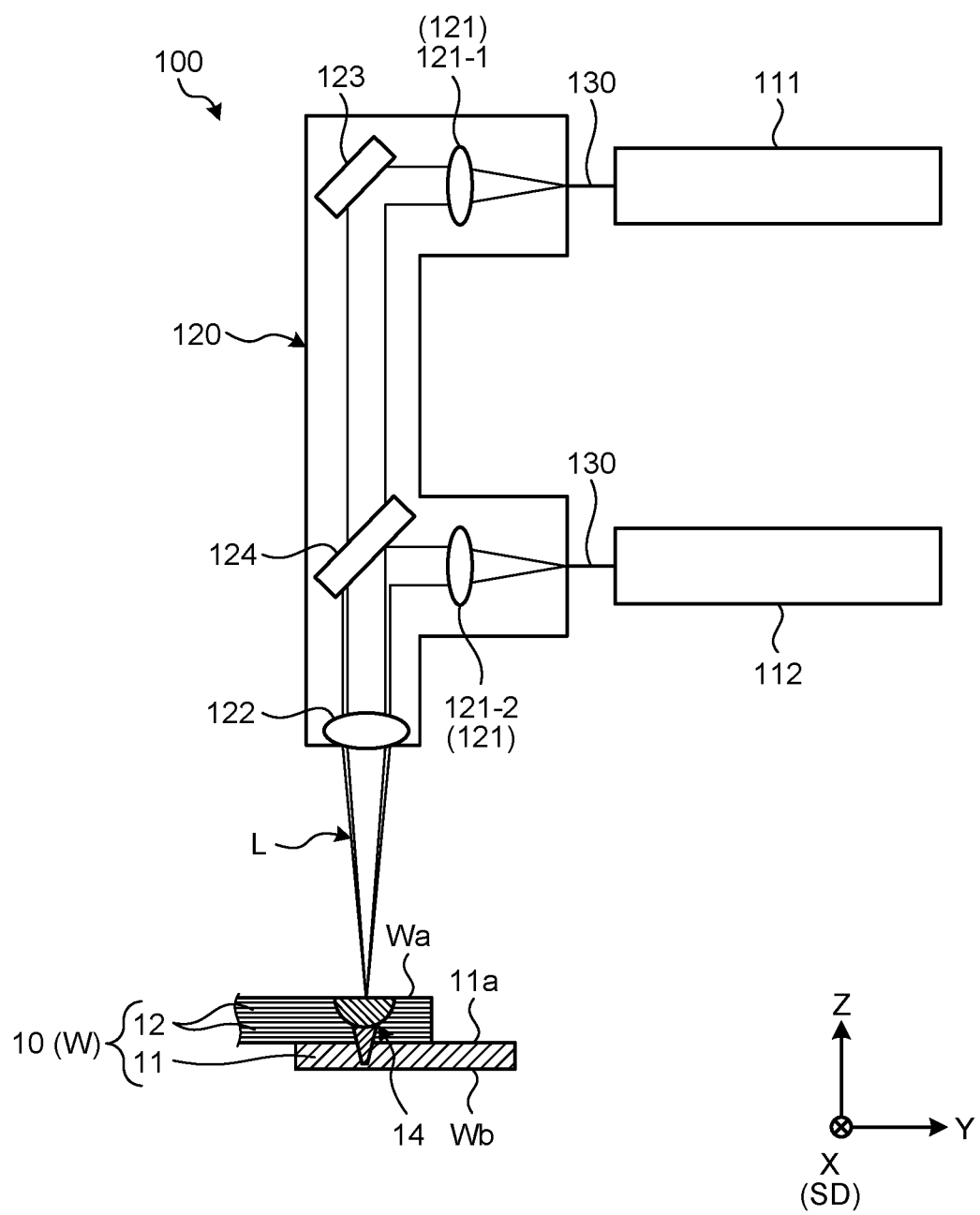
FIG. 1 is an exemplary schematic configuration diagram of a laser welding device of a first embodiment.

Hereinafter, exemplary embodiments of the present invention are disclosed. Configurations of the embodiments described below, and functions and results (effects) provided by the configurations are examples. The present invention can also be implemented by configurations other than those disclosed in the following embodiments. In addition, according to the present invention, it is possible to obtain at least one of various effects (including derivative effects) obtained by the configurations.

The embodiments described below have similar configurations. Therefore, according to the configurations of the embodiments, similar functions and effects based on the similar configurations can be obtained. In addition, in the following description, similar reference numerals are given to these similar configurations, and redundant description may be omitted.

In addition, in each of the drawings, an X direction is represented by an arrow X, a Y direction is represented by an arrow Y, and a Z direction is represented by an arrow Z. The X direction, the Y direction, and the Z direction intersect with each other and are orthogonal to each other. The X direction is a sweep direction SD, and the Y direction is a width direction of sweep. In addition, the Z direction is a normal line direction of a front surface Wa (machining surface, welding surface) of a workpiece W, a thickness direction of a metal foil 12, and a stacking direction of the metal foil 12 and a metal stacked body 10.

In addition, in the present specification, an ordinal number is given for convenience in order to distinguish components, members, portions, laser light beams, directions, and the like from each other, and do not indicate priority or order.

First Embodiment

FIG. 1 is a schematic configuration diagram of a laser welding device 100 of a first embodiment. As illustrated in FIG. 1, the laser welding device 100 includes a laser device 111, a laser device 112, an optical head 120, and an optical fiber 130. The laser welding device 100 is an example of a welding device.

The laser devices 111 and 112 each include a laser oscillator, and can output, for example, laser light having power of several kW. The laser devices 111 and 112 each emit laser light having a wavelength of 380 [nm] or more and 1200 [nm] or less. The laser devices 111 and 112 each internally include a laser light source such as a fiber laser, a semiconductor laser (element), a YAG laser, or a disk laser. The laser devices 111 and 112 each may be able to output multimode laser light having power of several kW as a sum of outputs of a plurality of light sources.

The laser device 111 outputs first laser light having a wavelength of 800 [nm] or more and 1200 [nm] or less. The laser device 111 is an example of a first laser device. As an example, the laser device 111 includes a fiber laser or a semiconductor laser (element) as a laser light source. The laser oscillator included in the laser device 111 is an example of a first laser oscillator.

Meanwhile, the laser device 112 outputs second laser light having a wavelength of 500 [nm] or less. The laser device 112 is an example of a second laser device. As an example, the laser device 112 includes a semiconductor laser (element) as a laser light source. The laser device 112 preferably outputs second laser light having a wavelength of 400 [nm] or more and 500 [nm] or less. The laser oscillator included in the laser device 112 is an example of a second laser oscillator.

The optical fiber 130 guides laser light output from each of the laser devices 111 and 112 to the optical head 120.

The optical head 120 is an optical device for irradiating the workpiece W with laser light input from each of the laser devices 111 and 112. The optical head 120 includes a collimator lens 121, a condenser lens 122, a mirror 123, and a filter 124. The collimator lens 121, the condenser lens 122, the mirror 123, and the filter 124 can also be referred to as optical components.

The optical head 120 can change a relative position with respect to the workpiece W in order to sweep laser light L while irradiating the front surface Wa of the workpiece W with the laser light L. The relative movement between the optical head 120 and the workpiece W can be implemented by movement of the optical head 120, movement of the workpiece W, or movement of both the optical head 120 and the workpiece W.

Note that the optical head 120 may be able to sweep the laser light L on the front surface Wa by including a galvano scanner (not illustrated) or the like.

The collimator lenses 121 (121-1 and 121-2) each collimate laser light input thereto via the optical fiber 130. The collimated laser light becomes parallel light.

The mirror 123 reflects the first laser light that has become parallel light through the collimator lens 121-1. The first laser light reflected by the mirror 123 travels in a direction opposite to the Z direction toward the filter 124. Note that in a configuration in which the first laser light is input to the optical head 120 so as to travel in a direction opposite to the Z direction, the mirror 123 is unnecessary.

The filter 124 is a high-pass filter that transmits the first laser light and reflects the second laser light without transmitting the second laser light. The first laser light passes through the filter 124, travels in a direction opposite to the Z direction, and travels toward the condenser lens 122. Meanwhile, the filter 124 reflects the second laser light that has become parallel light through the collimator lens 121-2. The second laser light reflected by the filter 124 travels in a direction opposite to the Z direction toward the condenser lens 122.

The condenser lens 122 condenses the first laser light and the second laser light as parallel light, and irradiates the workpiece W with the first laser light and the second laser light as laser light L (output light).

The workpiece W is the metal stacked body 10 in which a metal member 11 and a plurality of the metal foils 12 are stacked in the Z direction. The metal stacked body 10 is an example of a stacked body. The metal stacked body 10 includes the metal member 11, the plurality of metal foils 12, and a welded portion 14. The welded portion 14 mechanically and electrically connects the metal member 11 and the plurality of metal foils 12 to each other.

Figure 2:
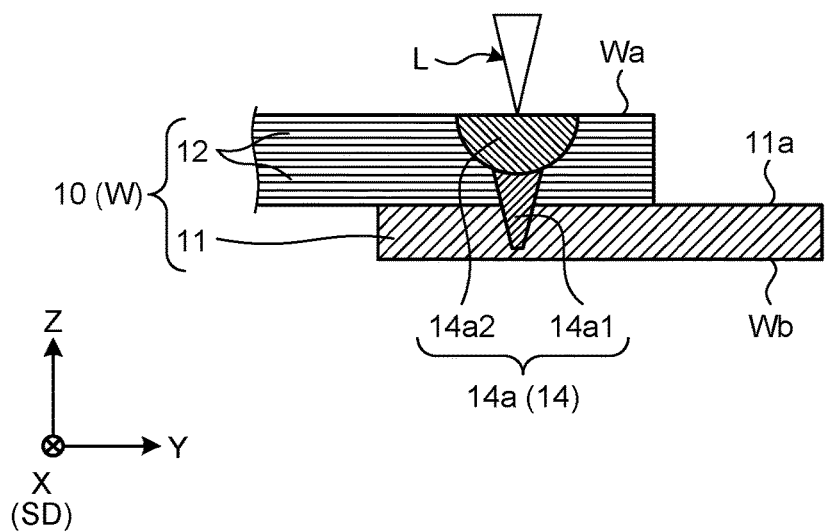
FIG. 2 is an exemplary and schematic cross-sectional view of a metal stacked body as a workpiece of the laser welding device of the first embodiment.

FIG. 2 is a cross-sectional view of the metal stacked body 10. The metal member 11 has a plate-like shape that extends while intersecting with the Z direction as an example. Note that the metal member 11 is not limited to a plate-like member. The plurality of metal foils 12 is stacked in the Z direction on an end surface 11a of the metal member 11 in the Z direction.

When the metal stacked body 10 is welded by the laser welding device 100, the metal stacked body 10 is integrally and temporarily fixed in the above-described stacked state by a fixing jig (not illustrated), and set in a posture in which a normal line direction of the front surface Wa of the metal foil 12 is substantially parallel to the Z direction. The fixing jig is, for example, two metal plates disposed apart from each other in the Z direction. The two metal plates sandwich the stacked metal member 11 and plurality of metal foils 12 in the Z direction in a posture intersecting with the Z direction. In a metal plate facing the optical head 120 out of the two metal plates, a through hole through which the laser light L can pass is formed. The through hole has a slit-like shape elongated in the sweep direction SD (X direction).

The front surface Wa is an end surface of the metal stacked body 10 in the Z direction, and is a surface of the metal foil 12 farthest from the metal member 11 among the plurality of metal foils 12, on a side opposite to the metal member 11. The laser light L is emitted to the front surface Wa in a direction opposite to the Z direction, in other words, emitted to the front surface Wa along the Z direction from a side opposite to the metal member 11. Note that a surface of the metal member 11, on a side opposite to the end surface 11a, is a back surface Wb of the metal stacked body 10. The front surface Wa is an irradiation surface of the laser light L, and can also be referred to as a facing surface facing the optical head 120. The Z direction is an example of the first direction. The end surface 11a is an example of the first surface, and the front surface Wa is an example of the second surface. In addition, the front surface Wa is an example of the first surface, and the back surface Wb is an example of the second surface.

By such irradiation with the laser light L, the welded portion 14 extends from the front surface Wa in a direction opposite to the Z direction. The direction opposite to the Z direction can also be referred to as a depth direction of the welded portion 14. In addition, the laser light L is swept in the X direction (sweep direction SD) on the front surface Wa, whereby the welded portion 14 also extends in the X direction with a cross-sectional shape substantially similar to that in FIG. 2. The X direction is an example of the second direction. The X direction can also be referred to as a longitudinal direction or an extending direction of the welded portion 14. In addition, the Y direction can also be referred to as a width direction of the welded portion 14.

The welded portion 14 includes a weld metal 14a. The weld metal 14a extends from the front surface Wa toward the metal member 11. The weld metal 14a has a first portion 14a1 and a second portion 14a2. The first portion 14a1 is mainly formed by irradiation with the first laser light, and the second portion 14a2 is mainly formed by irradiation with the second laser light. In the example of FIG. 2, the second portion 14a2 extends from the front surface Wa in a direction opposite to the Z direction. The second portion 14a2 is adjacent to the first portion 14a1 in the Z direction. That is, the first portion 14a1 is adjacent to the second portion 14a2 in a direction opposite to the Z direction. The second portion 14a2 is formed at least in the plurality of metal foils 12. The first portion 14a1 extends across the plurality of metal foils 12 and the metal member 11. In addition, the weld metal 14a does not penetrate the metal stacked body 10 along the Z direction as a whole. Note that the shape of the weld metal 14a is not limited to such a shape. The structure of the weld metal 14a including the first portion 14a1 and the second portion 14a2 will be described in detail later.

Figure 3:
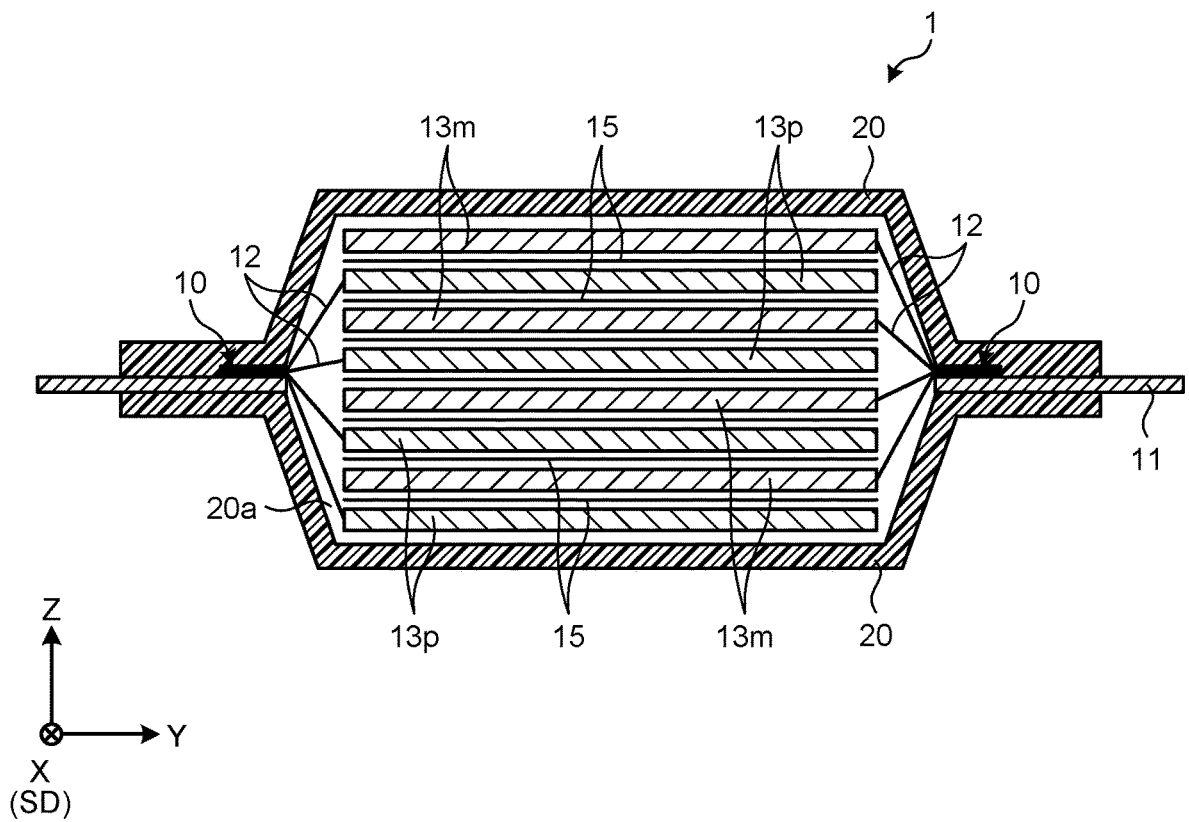
FIG. 3 is an exemplary and schematic cross-sectional view of a battery including a metal stacked body as a workpiece of the laser welding device of the first embodiment.

FIG. 3 is a cross-sectional view of a battery 1 as an electrical product including the metal stacked body 10. The battery 1 is one application example of the metal stacked body 10. In this case, the metal stacked body 10 is an example of an electrical component as a conductor, and is an example of an electrical component included in an electrical product. The electrical component can also be referred to as a component of an electrical product.

The battery 1 illustrated in FIG. 3 is, for example, a laminate type lithium ion battery cell. The battery 1 has two film-like exterior materials 20. A housing chamber 20a is formed between the two exterior materials 20. In the housing chamber 20a, a plurality of flat positive electrode materials 13p, a plurality of flat negative electrode materials 13m, and a plurality of flat separators 15 are housed. In the housing chamber 20a, the positive electrode material 13p and the negative electrode material 13m are alternately stacked with the separator 15 interposed therebetween. The metal foil 12 extends from each of the plurality of positive electrode materials 13p and the plurality of negative electrode materials 13m. In the example of FIG. 3, the plurality of metal foils 12 extending from the respective positive electrode materials 13p is stacked on the metal member 11 at an end portion of the battery 1 on a side opposite to the Y direction, and the metal stacked body 10 in which the metal member 11 and the plurality of metal foils 12 are welded to each other at the end portion is disposed. On a positive electrode side, only a part of the metal member 11 is exposed to the outside of the exterior material 20, and another part of the metal member 11, the plurality of metal foils 12, and the welded portion 14 are not exposed to the outside of the exterior material 20. The metal member 11 constitutes a positive electrode terminal of the battery 1. Meanwhile, the plurality of metal foils 12 extending from the respective negative electrode materials 13m is stacked on the metal member 11 at an end portion of the battery 1 in the Y direction, and the metal stacked body 10 in which the metal member 11 and the plurality of metal foils 12 are welded to each other at the end portion is disposed. Also on a negative electrode side, only a part of the metal member 11 is exposed to the outside of the exterior material 20, and another part of the metal member 11, the plurality of metal foils 12, and the welded portion 14 are not exposed to the outside of the exterior material 20. The metal member 11 constitutes a negative electrode terminal of the battery 1.

As illustrated in FIG. 3, each of the metal stacked bodies 10 is sandwiched between the two exterior materials 20. Air tightness or liquid tightness is ensured between the metal stacked body 10 and the exterior material 20 by a sealing material or the like. For this reason, the front surface Wa and the back surface Wb of the metal stacked body 10 are preferably in a state where unevenness is as small as possible, there is little unevenness, or there is no unevenness. In this regard, according to the welding method of the present embodiment, as will be described in detail later, generation of welding defects can be suppressed, and therefore unevenness of the front surface Wa due to the welding defects can be reduced. Therefore, the metal stacked body 10 welded by the welding method of the present embodiment is preferable for the positive electrode terminal and the negative electrode terminal of the battery 1. Note that in a case where the battery 1 is a lithium ion battery cell, the metal foil 12 constituting the metal stacked body 10 as the positive electrode terminal is made of, for example, an aluminum-based metal material, and the metal foil 12 constituting the metal stacked body 10 as the negative electrode terminal is made of, for example, a copper-based metal material. The positive electrode terminal and the negative electrode terminal are examples of an electrical component. The metal stacked body 10 or the metal member 11 can also be referred to as an electrode tab or a tab. In addition, the metal member 11 can also be referred to as a conductive member.

Figure 4:
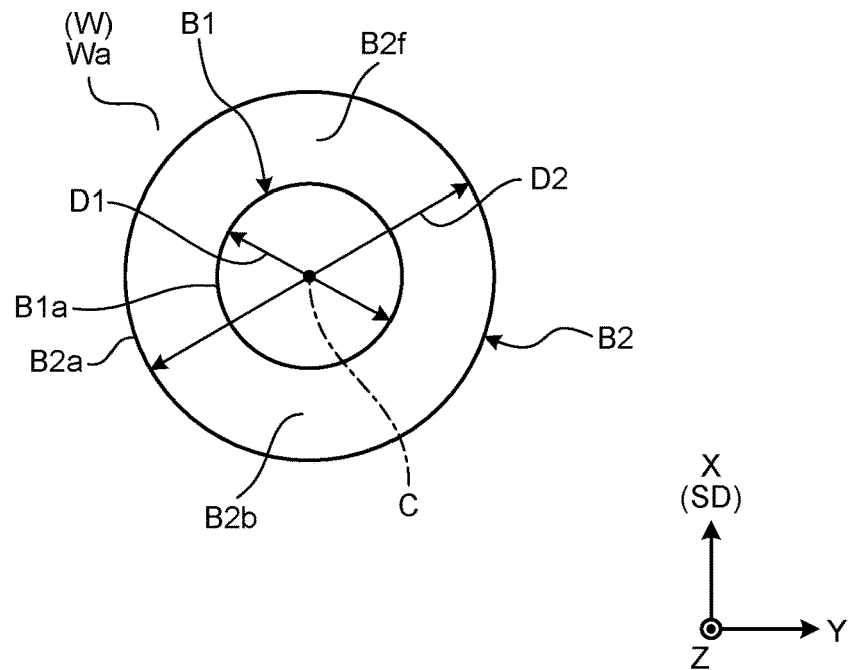
FIG. 4 is an exemplary schematic diagram illustrating a beam (spot) of laser light formed on a surface of a workpiece by the laser welding device of the first embodiment.

FIG. 4 is a schematic diagram illustrating a beam (spot) of the laser light L emitted onto the front surface Wa. Each of a beam B1 and a beam B2 has, for example, a power distribution having a Gaussian shape in a radial direction of a cross section orthogonal to an optical axis direction of the beam B1 and the beam B2. Note that the power distribution of each of the beam B1 and the beam B2 is not limited to the Gaussian shape. In addition, in the drawings in which each of the beams B1 and B2 is represented by a circle as illustrated in FIG. 4, the diameters of the circles representing the beams B1 and B2 are the beam diameters of the beams B1 and B2, respectively. The beam diameter of each of the beams B1 and B2 includes a peak of each of the beams B1 and B2 and is defined as a diameter of a region having an intensity of $1/e^2$ or more of a peak intensity. Note that, although not illustrated, in a case of a non-circular beam, the length of a region having an intensity of $1/e^2$ or more of a peak intensity in a direction perpendicular to the sweep direction SD can be defined as the beam diameter. In addition, the beam diameter on the front surface Wa is referred to as a spot diameter.

As illustrated in FIG. 4, in the present embodiment, as an example, a beam of the laser light L is formed such that the beam B1 of the first laser light and the beam B2 of the second laser light overlap with each other on the front surface Wa, the beam B2 is larger (wider) than the beam B1, and an outer edge B2a of the beam B2 surrounds an outer edge B1a of the beam B1. In this case, a spot diameter D2 of the beam B2 is larger than a spot diameter D1 of the beam B1. On the front surface Wa, the beam B1 is an example of a first spot, and the beam B2 is an example of a second spot.

In addition, in the present embodiment, as illustrated in FIG. 4, since the beam (spot) of the laser light L has a point symmetrical shape with respect to a center point C on the front surface Wa, the shapes of the spots are the same in an arbitrary sweep direction SD. Therefore, in a case where a movement mechanism that relatively moves the optical head 120 and the workpiece W for sweeping on the front surface Wa of the laser light L is included, the movement mechanism only needs to have at least a relatively translatable mechanism, and a relatively rotatable mechanism can be omitted in some cases.

Each of the metal member 11 and the metal foil 12 as the workpiece W can be made of a conductive metal material. Examples of the metal material include a copper-based metal material, an aluminum-based metal material, a nickel-based metal material, an iron-based metal material, and a titanium-based metal material, and specific examples thereof include copper, a copper alloy, aluminum, an aluminum alloy, tin, nickel, a nickel alloy, iron, stainless steel, titanium, and a titanium alloy. The metal member 11 and the metal foil 12 may be made of the same material or different materials.

Wavelength and Light Absorption Ratio

Figure 5:
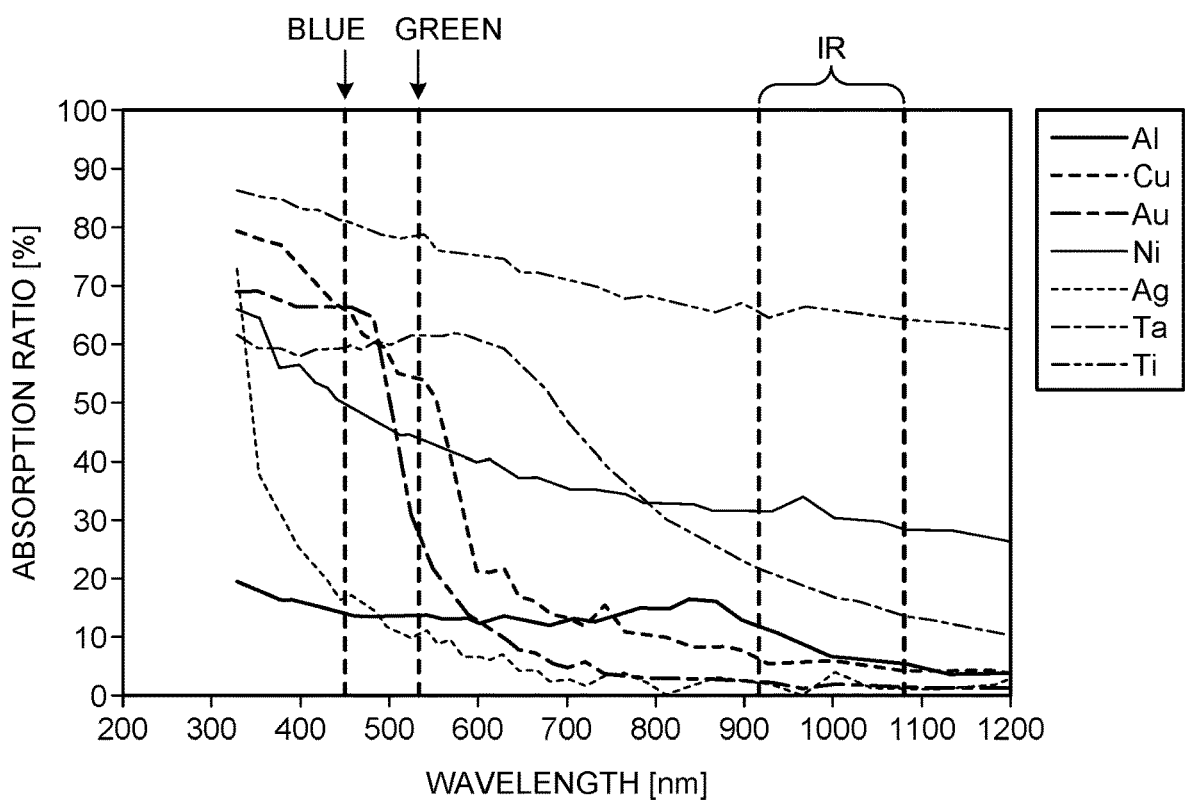
FIG. 5 is a graph illustrating a light absorption ratio of each metal material with respect to a wavelength of laser light to be emitted.

Here, a light absorption ratio of the metal material will be described. FIG. 5 is a graph illustrating a light absorption ratio of each metal material with respect to a wavelength of the laser light L to be emitted. In the graph of FIG. 5, the horizontal axis represents a wavelength, and the vertical axis represents an absorption ratio. FIG. 5 illustrates a relationship between a wavelength and an absorption ratio for aluminum (Al), copper (Cu), gold (Au), nickel (Ni), silver (Ag), tantalum (Ta), and titanium (Ti).

It can be understood that, for each of the metals illustrated in FIG. 5, an energy absorption ratio is higher when blue or green laser light (second laser light) is used than when general infrared (IR) laser light (first laser light) is used although characteristics are different depending on a material. This characteristic is remarkable in copper (Cu), gold (Au), and the like.

In a case where the workpiece W having a relatively low absorption ratio with respect to a used wavelength is irradiated with laser light, most of light energy is reflected and does not affect the workpiece W as heat. Therefore, it is necessary to give relatively high power in order to obtain a melted region having a sufficient depth. In this case, energy is rapidly input to a beam center portion, whereby sublimation occurs and a keyhole is formed.

Meanwhile, in a case where the workpiece W having a relatively high absorption ratio with respect to a used wavelength is irradiated with laser light, most of input energy is absorbed by the workpiece W and converted into thermal energy. That is, since it is not necessary to give excessive power, a keyhole is not formed, and thermally conductive melting occurs.

In the present embodiment, a wavelength of the first laser light, a wavelength of the second laser light, and a material of the workpiece W are selected such that an absorption ratio of the workpiece W with respect to the second laser light is higher than an absorption ratio of the workpiece W with respect to the first laser light. In this case, when a sweep direction is the sweep direction SD illustrated in FIG. 4, a portion to be welded (hereinafter, referred to as a portion to be welded) of the workpiece W is first irradiated with the second laser light by a region B2f of the beam B2 of the second laser light located ahead in SD in FIG. 4 due to sweep of the spot of the laser light L. Thereafter, the portion to be welded is irradiated with the beam B1 of the first laser light, and then irradiated with the second laser light again by a region B2b of the beam B2 of the second laser light located backward in the sweep direction SD.

Therefore, first, a thermally conductive melted region is generated in the portion to be welded by irradiation with the second laser light having a high absorption ratio in the region B2f. Thereafter, a deeper keyhole type melted region is generated in the portion to be welded by irradiation with the first laser light. In this case, since the thermally conductive melted region is formed in advance in the portion to be welded, a melted region having a required depth can be formed by the first laser light having lower power as compared with a case where the thermally conductive melted region is not formed. Thereafter, the portion to be welded is further irradiated with the second laser light having a high absorption ratio in the region B2b to change a melted state thereof. The second laser light preferably has a wavelength of 550 [nm] or less, more preferably 500 [nm] or less from such a viewpoint.

In addition, as a result of experimental studies of the inventors, it has been confirmed that welding defects such as spatters and blowholes can be reduced in welding by irradiation with the laser light L having such a beam as illustrated in FIG. 4. It can be estimated that this is because a melted pool of the workpiece W formed by the beam B2 and the beam B1 is further stabilized by heating the workpiece W in advance by the region B2f of the beam B2 before the beam B1 arrives.

Furthermore, as a result of experimental studies of the inventors, it has been found that when the temperature of the metal foil 12 becomes higher than the temperature of the metal member 11 by irradiation with the laser light L, the plurality of metal foils 12 is stretched due to thermal expansion, bent and buckled so as to swell away from the metal member 11, a gap is generated between the plurality of metal foils 12 and the metal member 11, and only the plurality of metal foils 12 is welded or welding occurs in a state where a gap is opened between the plurality of metal foils 12 and the metal member 11 in some cases. Furthermore, the inventors have found that welding in a state where such a gap is generated can be prevented by setting appropriate conditions. The preferable conditions will be described later.

Welding Method

In welding using the laser welding device 100, first, the metal stacked body 10 in which the metal member 11 and the plurality of metal foils 12 are integrally and temporarily fixed by a holder is set such that the front surface Wa is irradiated with the laser light L. Then, in a state where the front surface Wa is irradiated with the laser light L including the beam B1 and the beam B2, the laser light L and the metal stacked body 10 are relatively moved. As a result, the laser light L moves (sweeps) in the sweep direction SD on the front surface Wa while being emitted onto the front surface Wa. A portion irradiated with the laser light L is melted and then solidified as the temperature falls, whereby the metal member 11 and the plurality of metal foils 12 are welded to each other to integrate the metal stacked body 10.

Cross Section of Welded Portion

Figure 6:
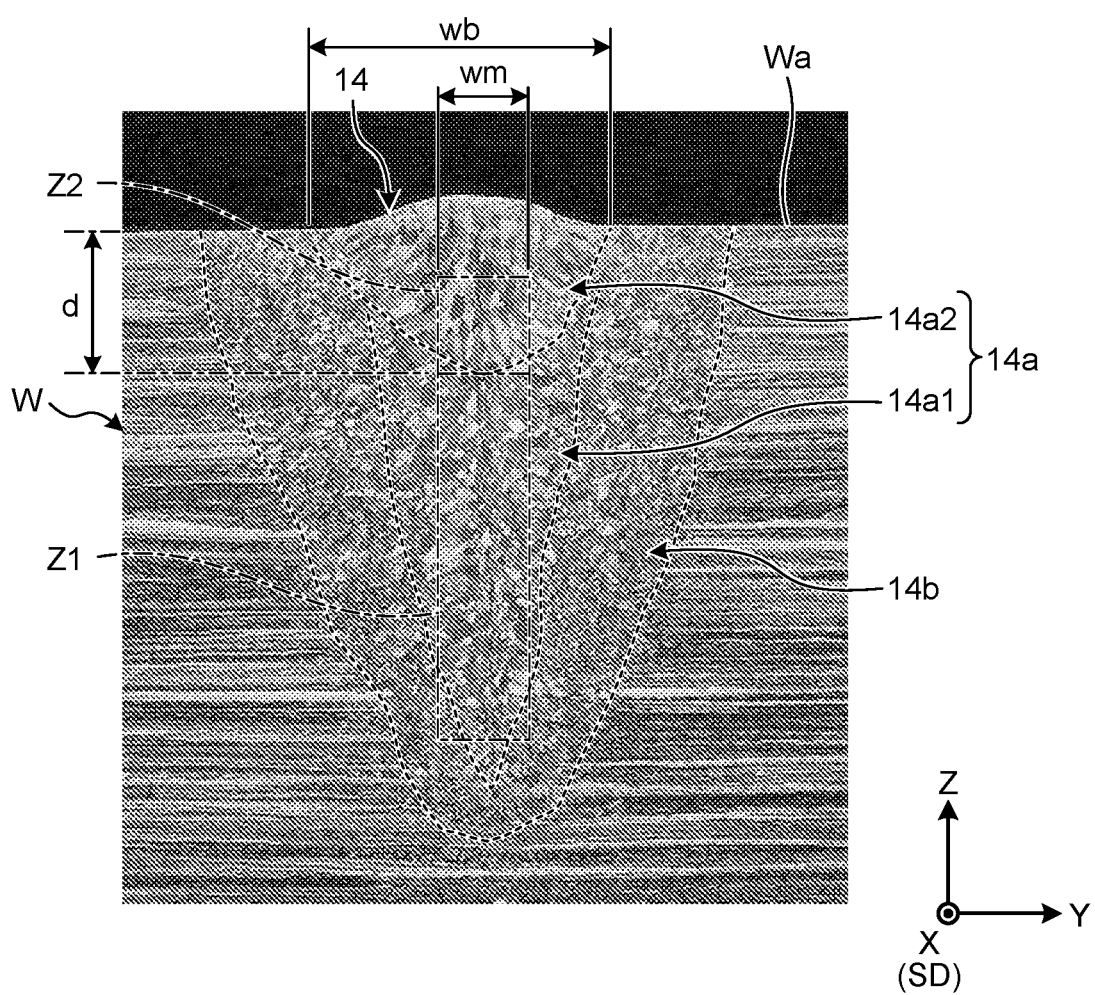
FIG. 6 is an exemplary and schematic cross-sectional view of a welded portion of an embodiment.

FIG. 6 is a cross-sectional view of the welded portion 14 formed in the workpiece W. FIG. 6 is a cross-sectional view perpendicular to the sweep direction SD (X direction) and along the thickness direction (Z direction). The welded portion 14 extends in the sweep direction SD, that is, in a direction perpendicular to the paper surface of FIG. 6. Note that FIG. 6 illustrates a cross section of the welded portion 14 formed on the workpiece W which is one copper plate having a thickness of 2 [mm]. The form of the welded portion 14 formed in the metal stacked body 10 of the metal member 11 and the plurality of metal foils 12 stacked in the Z direction can be estimated to be substantially equivalent to the form of the welded portion 14 formed in the workpiece W which is one metal material illustrated in FIG. 6.

As illustrated in FIG. 6, the welded portion 14 includes the weld metal 14a extending from the front surface Wa in a direction opposite to the Z direction, and a thermally affected portion 14b located around the weld metal 14a. The weld metal 14a is a portion melted by irradiation with the laser light L and then solidified. The weld metal 14a can also be referred to as a melted and solidified portion. In addition, the thermally affected portion 14b is a portion where a base material of the workpiece W is thermally affected and is not melted.

The width of the weld metal 14a along the Y direction becomes narrower as a distance from the front surface Wa increases. That is, a cross section of the weld metal 14a has a tapered shape that narrows in a direction opposite to the Z direction.

In addition, detailed analysis of the cross section by the inventors has revealed that the weld metal 14a includes the first portion 14a1 away from the front surface Wa and the second portion 14a2 between the first portion 14a1 and the front surface Wa.

The first portion 14a1 is a portion obtained by keyhole type melting by irradiation with the first laser light, and the second portion 14a2 is a portion obtained by melting by irradiation with the region B2b in the beam B2 of the second laser light located backward in the sweep direction SD. According to analysis by an electron back scattered diffraction pattern (EBSD) method, it has been found that the size of a crystal grain is different between the first portion 14a1 and the second portion 14a2, and specifically, in a cross section orthogonal to the X direction (sweep direction SD), an average value of cross-sectional areas of the crystal grains in the second portion 14a2 is larger than an average value of cross-sectional areas of the crystal grains in the first portion 14a1.

The inventors have confirmed that in a case where the workpiece W is irradiated with only the beam B1 of the first laser light, that is, in a case where the workpiece W is not irradiated with the region B2b in the beam B2 located backward in the sweep direction SD, the second portion 14a2 is not formed, and the first portion 14a1 extends deeply from the front surface Wa in a direction opposite to the Z direction. That is, in the present embodiment, since the second portion 14a2 is formed near the front surface Wa by irradiation with the region B2b in the beam B2 located backward in the sweep direction SD, it can be estimated that the first portion 14a1 is formed on a side opposite to the front surface Wa with respect to the second portion 14a2, in other words, at a position away from the front surface Wa in a direction opposite to the Z direction.

Figure 7:
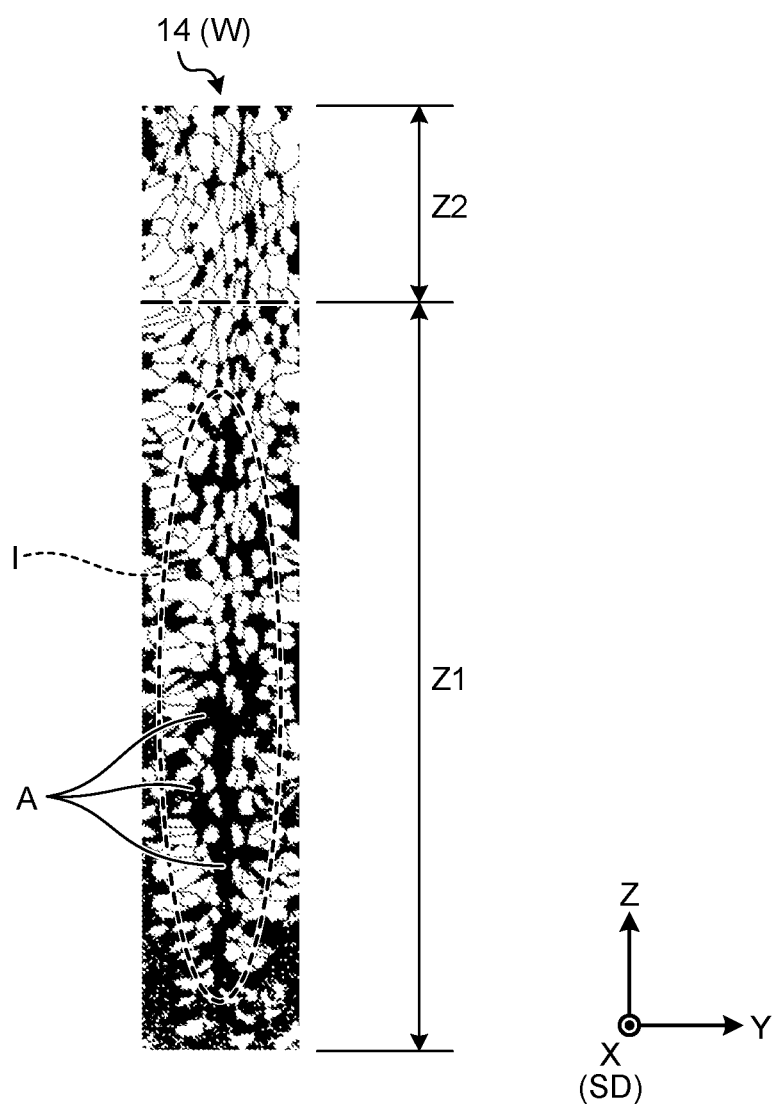
FIG. 7 is an exemplary and schematic cross-sectional view illustrating a part of a welded portion of an embodiment.

FIG. 7 is a cross-sectional view illustrating a part of the welded portion 14. FIG. 7 illustrates boundaries of crystal grains obtained by an EBSD method. In addition, in FIG. 7, as an example, crystal grains A each having a crystal grain size of 13 [□m] or less are painted black. Note that 13 [□m] is not a threshold of physical characteristics, but is a threshold set for analysis of the experimental result. In addition, it is clear from FIG. 7 that the crystal grains A are present in a relatively large amount in the first portion 14a1 and are present in a relatively small amount in the second portion 14a2. That is, the average value of the cross-sectional areas of the crystal grains in the second portion 14a2 is larger than the average value of the cross-sectional areas of the crystal grains in the first portion 14a1. The inventors have confirmed by experimental analysis that the average value of the cross-sectional areas of the crystal grains in the second portion 14a2 is 1.8 times or more the average value of the cross-sectional areas of the crystal grains in the first portion 14a1.

As illustrated in a region I in FIG. 7, the crystal grains A each having such a relatively small size are densely present in a state of being elongated in the Z direction at a position away from the front surface Wa in the Z direction. In addition, from analysis at a plurality of places having different positions in the X direction (sweep direction SD), it is confirmed that the region where the crystal grains A are densely present also extends in the sweep direction SD. Since welding is performed while sweeping is performed, it can be estimated that crystals are formed in a similar form in the sweep direction SD.

In a case where it is difficult to distinguish between the first portion 14a1 and the second portion 14a2 from an appearance in a cross section, a hardness distribution, or the like, a first region Z1 and a second region Z2 geometrically determined from a position and a width wb on the front surface Wa of the weld metal 14a as illustrated in FIGS. 6 and 7 may be defined as the first portion 14a1 and the second portion 14a2, respectively. As an example, the first region Z1 and the second region Z2 can be quadrangular regions extending in the Z direction with a width wm (equal width in the Y direction) in a cross section orthogonal to the sweep direction SD, the second region Z2 can be a region from the front surface Wa to a depth d in the Z direction, and the first region Z1 can be a region deeper than the depth d, in other words, a region opposite to the front surface Wa with respect to the position of the depth d. The width wm can be, for example, ⅓ of the width wb (average value of bead widths) on the front surface Wa of the weld metal 14a, and the depth d (height, thickness) of the second region Z2 can be, for example, ½ of the width wb. In addition, the depth of the first region Z1 can be, for example, three times the depth d of the second region Z2. As a result of experimental analysis on a plurality of samples, the inventors have confirmed that in setting of the first region Z1 and the second region Z2, the average value of the cross-sectional areas of the crystal grains in the second region Z2 is larger than the average value of the cross-sectional areas of the crystal grains in the first region Z1 and is 1.8 times or more. Such distinguishment can also be evidence that the first portion 14a1 and the second portion 14a2 are formed in the weld metal 14a by welding.

In addition, the inventors experimentally analyzed a ratio between an energy density of the first laser light on the front surface Wa and an energy density of the second laser light on the front surface Wa. Here, for each of the first laser light and the second laser light, an effective energy density E on the front surface Wa is defined by the following formula (1).

$$E_n = Am \times P_n / (D_n \times V) \quad (1)$$

Here, $E_n$ represents an effective energy density [J/mm²], Am represents an absorption ratio of a material of the workpiece W, $P_n$ represents an output [W] of laser light by a laser device, $D_n$ represents a spot diameter [mm] on the front surface Wa, and V represents a sweep speed [mm/s]. Here, the parameters are distinguished from each other by a subscript n. n=1 indicates a parameter of the first laser light, and n=2 indicates a parameter of the second laser light.

As a result, a ratio R of the effective energy density $E_1$ of the first laser light to the effective energy density $E_2$ of the second laser light on the front surface Wa can be expressed by the following formula (2).

$$R = E_1 / E_2 \quad (2)$$

Note that the ratio R is a dimensionless number. The effective energy density $E_1$ is an example of the first energy density, and the effective energy density $E_2$ is an example of the second energy density.

The inventors performed experiments under conditions of the ratio R of 2 or more and 47 or less, under conditions of irradiation with only the first laser light, and under conditions of irradiation with only the second laser light. According to the experimental analysis by the inventors, it has been found that the ratio R is preferably 1 or more and 10 or less, and more preferably 2 or more and 8 or less from viewpoints of suppression of spatters, suppression of blowholes in the metal foil 12, and melting depth of the welded portion 14 equal to or more than a threshold. In addition, as for a gap between the plurality of metal foils 12 and the metal member 11, it has been found that in a case where the ratio R is as low as less than 1, heat applied to the plurality of metal foils 12 by irradiation with the second laser light does not reach the metal member 11, and the plurality of metal foils 12 is mainly heated, whereby the metal foils 12 are stretched, bent, and buckled, and the gap is generated. That is, the inventors have found that generation of a gap between the plurality of metal foils 12 and the metal member 11 can be prevented by setting the ratio R to 1 or more.

As for the ratio R, specifically, in a case where 50 metal foils 12 each made of oxygen-free copper having a thickness of 8 [□m] were stacked and welded to the metal member 11, when an output of the beam B1 of the first laser light was 500 [W] or more, an output of the beam B2 of the second laser light was 100 [W] or more, and the ratio R was approximately 6, the best welding state in which spatters and blowholes were minimized was obtained. In addition, in a case where 100 metal foils 12 each made of oxygen-free copper having a thickness of 8 [□m] were stacked and welded to the metal member 11, when an output of the beam B1 of the first laser light was 1000 [W] or more, an output of the beam B2 of the second laser light was 400 [W] or more, and the ratio R was approximately 3.7, the best welding state in which spatters and blowholes were minimized was obtained.

In addition, the inventors performed experimental analysis on a case where the thickness of the metal member 11 in the Z direction is 0.05 [mm] or more and 2.0 [mm] or less, which is a practically assumed range, and the thickness of the layers of the plurality of metal foils 12 in the Z direction is 0.05 [mm] or more and 2.0 [mm] or less, which is a practically assumed range. When the thickness of the metal member 11 and the thickness of the layers of the plurality of metal foils 12 are thin, diffusion of heat is suppressed, and therefore sublimation of the material due to a rapid temperature rise may occur at the time of irradiation with laser light, and eventually cutting may occur. In this regard, the inventors have confirmed by the experimental analysis that such cutting does not occur when the thickness of the metal member 11 and the thickness of the layers of the plurality of metal foils 12 in the Z direction are each 0.05 [mm] or more.

Figure 8:
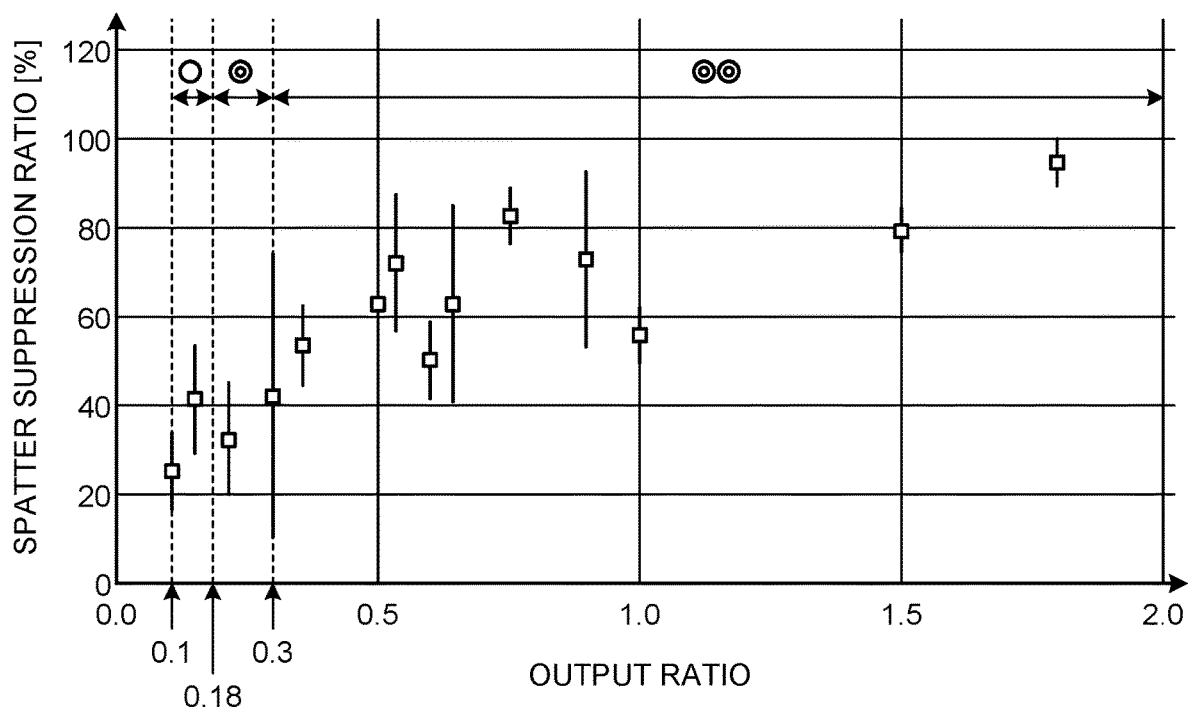
FIG. 8 is a graph illustrating a correlation between an output ratio, which is a ratio of power of second laser light to power of first laser light by a laser welding device of an embodiment, and a spatter suppression ratio.

Suppression of Spatters by Output Ratio Between First Laser Light and Second Laser Light FIG. 8 is a graph illustrating a correlation between an output ratio (Rp=Pw2/Pw1), which is a ratio of power (Pw2) of the second laser light to power (Pw1) of the first laser light, and a spatter suppression ratio. Here, a spatter suppression ratio Rs is defined as expressed by the following formula (3).

$$Rs = 1 - Nh/Nir \quad (3)$$

Here, Nh is the number of spatters generated in a predetermined area in a case where both the first laser light and the second laser light are emitted, and Nir is the number of spatters generated in the predetermined area in a case where only the first laser light is emitted with the same power as that at the time of measuring Nh. In addition, FIG. 8 illustrates a result of performing an experiment a plurality of times at each output ratio. A line segment corresponding to an output ratio indicates a range of variation in a spatter suppression ratio in experimental results of a plurality of samples (at least three samples) at the output ratio, and □ indicates a median value of spatter suppression ratios for each output ratio.

As illustrated in FIG. 8, as a result of experimental studies of the inventors, it has been found that the output ratio Rp is preferably 0.1 or more and less than 0.18 (○), more preferably 0.18 or more and less than 0.3 (◎), and still more preferably 0.3 or more and 2 or less (◎◎).

Distinguishment of Portions by Orientation of Crystal Grain

Figure 9:
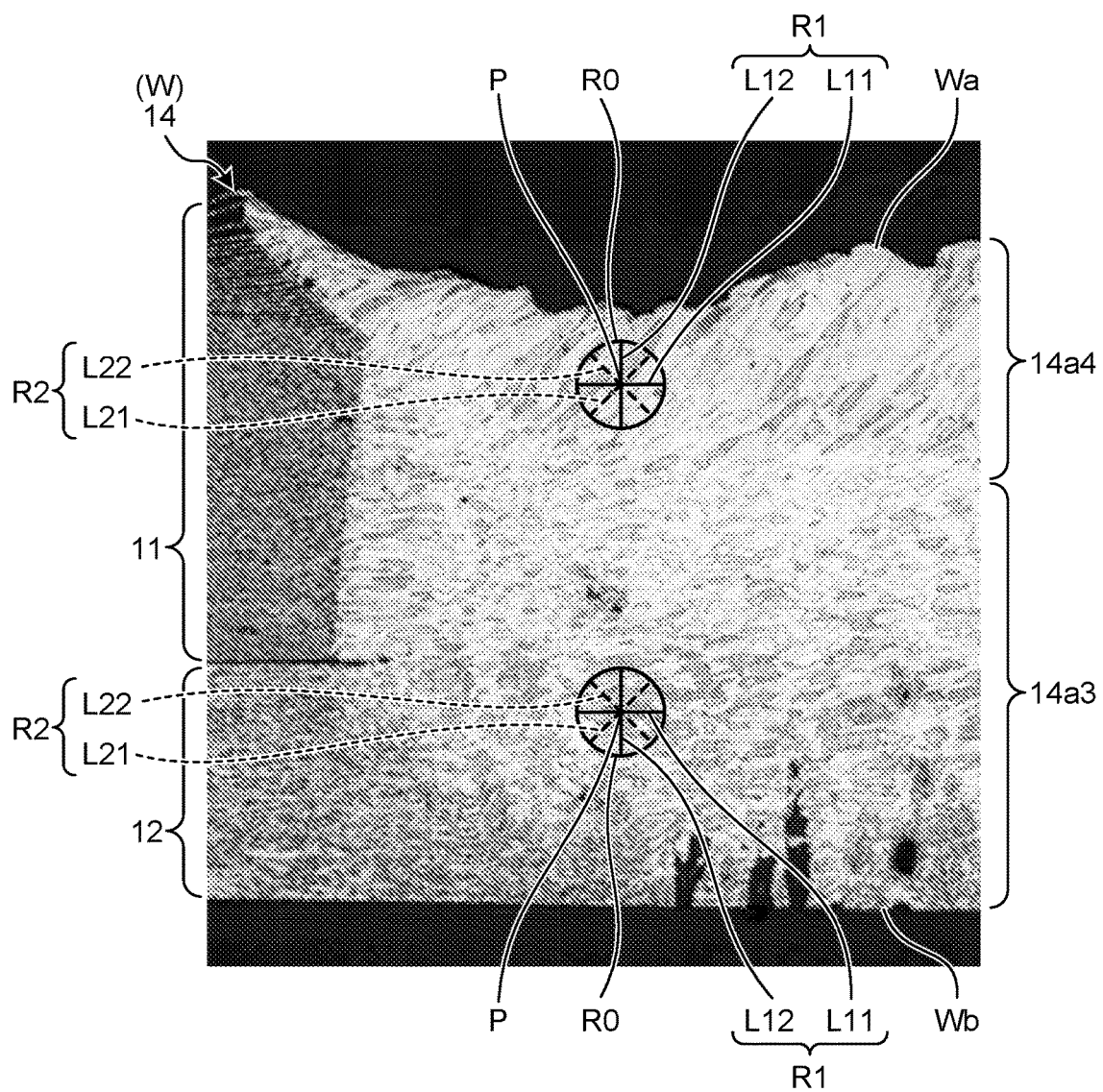
FIG. 9 is an enlarged view of a part of FIG. 2.
Figure 9:
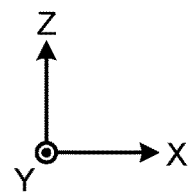

FIG. 9 is an enlarged view of a part of FIG. 2. As a result of experimental studies of the inventors, as illustrated in FIG. 9, in the welded portion 14 formed by irradiation with both the first laser light and the second laser light, it has been found that the orientation of a crystal grain (longitudinal direction, growth direction) varies depending on a depth from the front surface Wa. This is considered to be because a third portion 14a3 obtained by keyhole type melting by irradiation with the first laser light and a fourth portion 14a4 obtained by melting by irradiation with the region B2b in the beam B2 of the second laser light located backward in the sweep direction have different situations of crystal grain growth during solidification. Here, the third portion 14a3 is a portion located away from the front surface Wa and is a portion corresponding to the above-described first portion 14a1. In addition, the fourth portion 14a4 is a portion located between the third portion 14a3 and the front surface Wa, and is a portion corresponding to the above-described second portion 14a2.

In order to numerically express such a configuration, the inventors defined an index representing an orientation (longitudinal direction) of a crystal grain in each part in the welded portion 14 in accordance with A.2: cutting method of JIS G 0551: 2020.

Specifically, as illustrated in FIG. 9, two types of reference lines, a first reference line R1 and a second reference line R2 each including two linear test lines orthogonal to each other are used in an image of a cross section. In FIG. 9, the first reference line R1 is indicated by a solid line, and the second reference line R2 is indicated by a broken line. The first reference line R1 has two diameters of a reference circle R0 orthogonal to each other as the linear test lines L11 and L12. One linear test line L11 extends in the X direction (sweep direction) along the front surface Wa, and the other linear test line L12 extends in the Z direction orthogonal to the front surface Wa. In addition, the second reference line R2 has two diameters of the same reference circle R0 as the first reference line R1, orthogonal to each other as the linear test lines L21 and L22. One linear test line L21 extends in a direction between the X direction and the Z direction, and the other linear test line L22 extends in a direction between a direction opposite to the X direction and the Z direction or in a direction between a direction opposite to the Z direction and the X direction. An angle difference between the linear test line L11 and the linear test line L21 is 45° or 135°, and an angle difference between the linear test line L12 and the linear test line L22 is 45° or 135°. The length of the diameter of the reference circle R0, that is, the length of each of the linear test lines L11, L12, L21, and L22 is, for example, a length corresponding to 200 [μm] (an example of a predetermined length), but can be appropriately set according to the size of a crystal grain.

Then, the first reference line R1 and the second reference line R2 are applied to each point P in the welded portion 14, and a first grain boundary number ratio Rb1 and a second grain boundary number ratio Rb2 are determined by the following formulas (3-1) and (3-2).

$$Rb1=N12/N11 \quad (3\text{-}1)$$

$$Rb2=\max(N22/N21, N21/N22) \quad (3\text{-}2)$$

Here, N11 represents the number of crystal grains intersecting with the linear test line L11, and N12 represents the number of crystal grains intersecting with the linear test line L12. N21 represents the number of crystal grains intersecting with the linear test line L21, and N22 represents the number of crystal grains intersecting with the linear test line L22. The number of crystal grains can also be referred to as the number of grain boundaries. In addition, in formula (3-2), in a case where (N22/N21) is (N21/N22) or more, max (N22/N21, N21/N22) is (N22/N21), and in a case where (N22/N21) is less than (N21/N22), max (N22/N21, N21/N22) is (N21/N22). In actual measurement, in a micrograph of an X-Z cross section taken at a magnification of 50 times, the above measurement is performed at arbitrary predetermined places or more, for example, ten places or more, and average values thereof can be defined as Rb1 and Rb2, respectively. Note that in a case where any one of N11, N12, N21, and N22 is zero at a certain point P in the welded portion 14, the number of grain boundaries at the point P does not have to be used for calculation of Rb1 and Rb2.

Figure 10:
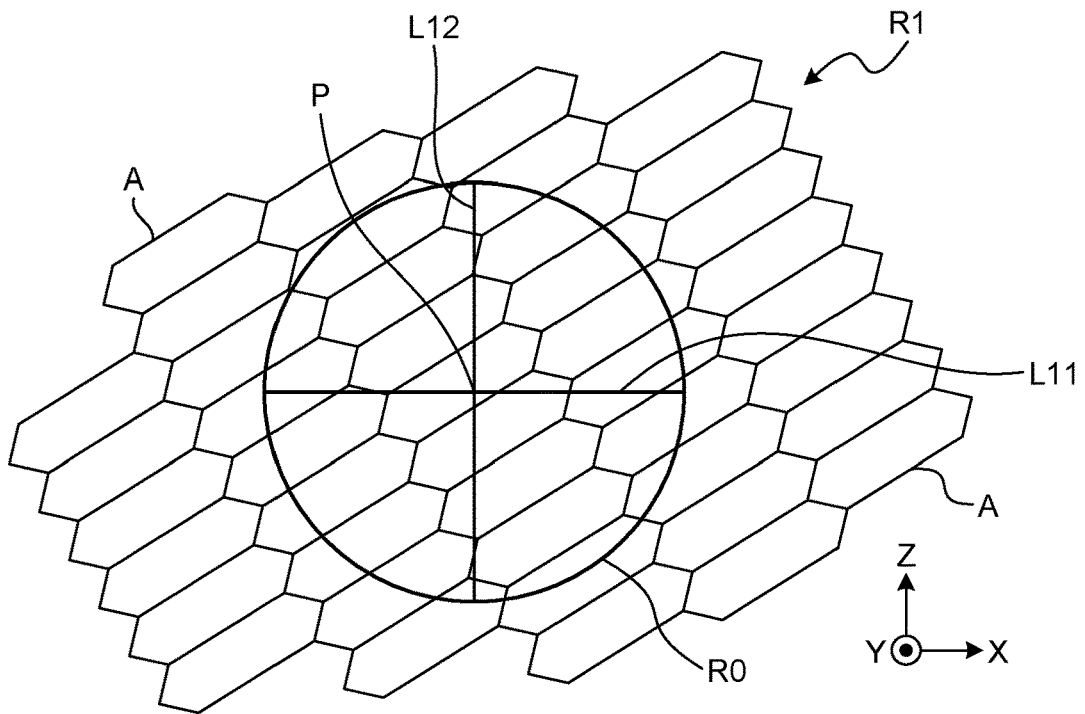
FIG. 10 is an explanatory diagram illustrating a case where a first reference line is applied to one position in a cross section of a welded portion of an embodiment.
Figure 11:
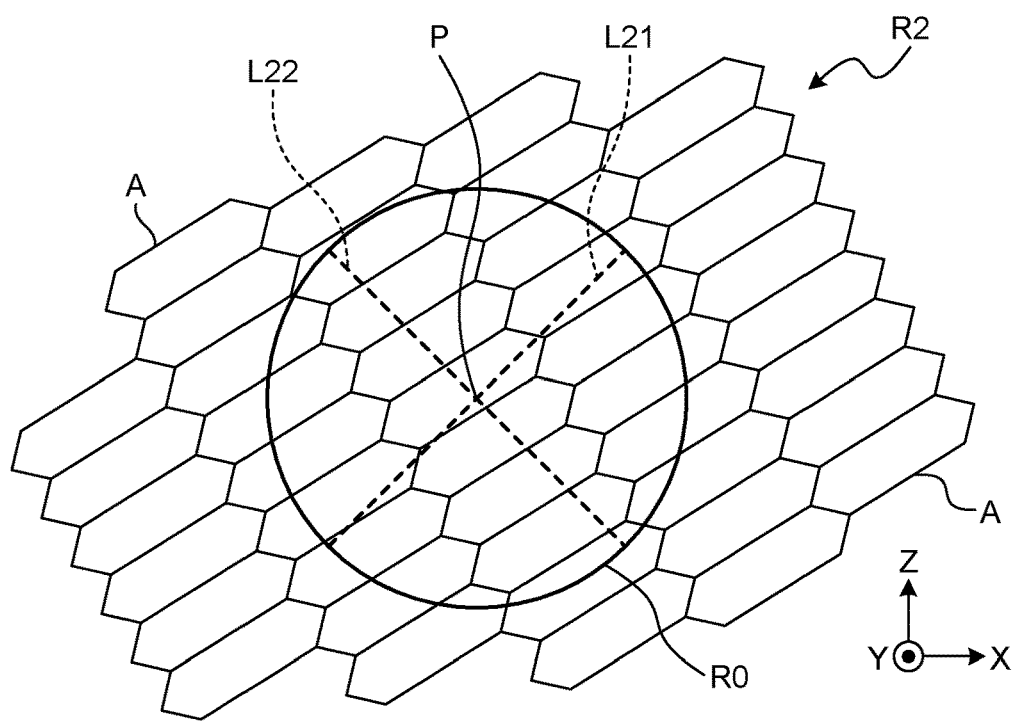
FIG. 11 is an explanatory diagram illustrating a case where a second reference line is applied to one position in a cross section of a welded portion of an embodiment.

FIGS. 10 and 11 are schematic explanatory diagrams illustrating a case where the first reference line R1 is applied (FIG. 10) and a case where the second reference line R2 is applied (FIG. 11) to one point P in a cross section of the welded portion 14. As illustrated in FIGS. 10 and 11, the numbers of crystal grains A (grain boundaries) intersecting with the linear test lines L11, L12, L21, and L22 are different from each other. In the examples of FIGS. 10 and 11, since an angle difference between the linear test line L21 and the crystal grains A is relatively small, the number of grain boundaries N21 is smaller than the other numbers of grain boundaries N11, N12, and N22. Therefore, the point P illustrated in the examples of FIGS. 10 and 11 is the point P where the second grain boundary number ratio Rb2 is higher than the first grain boundary number ratio Rb1. Similarly, in the above-described definition, at the point P where the angle difference between the longitudinal direction of the crystal grains A and the X direction is relatively small in the reference circle R0, the first grain boundary number ratio Rb1 ii relatively high and is larger than the second grain boundary number ratio Rb2. In addition, at the point P where the angle difference between the longitudinal direction of the crystal grains A and the direction (45° direction) between the X direction and the Z direction is relatively small, the second grain boundary number ratio Rb2 is relatively high and larger than the first grain boundary number ratio Rb1.

As a result of experimental studies of the inventors, it has been found that the first grain boundary number ratio Rb1 at each point P in the fourth portion 14a4 is lower than the first grain boundary number ratio Rb1 at each point P in the third portion 14a3. In addition, it has been found that the second grain boundary number ratio Rb2 at each point P in the fourth portion 14a4 is higher than the second grain boundary number ratio Rb2 at each point P in the third portion 14a3. In addition, it has been found that the first grain boundary number ratio Rb1 is higher than the second grain boundary number ratio Rb2 at each point P in the third portion 14a3, and the second grain boundary number ratio Rb2 is higher than the first grain boundary number ratio Rb1 at each point P in the fourth portion 14a4. Presence of such portions having different first grain boundary number ratios Rb1 and different second grain boundary number ratios Rb2 in the welded portion 14 is considered to be a factor of achieving a strong welding strength in the workpiece W, and can be an evidence that welding has been performed by irradiation with both the first laser light and the second laser light.

As described above, in the welding method of the present embodiment, for example, the metal stacked body 10 (stacked body) in which the plurality of metal foils 12 is superimposed on the end surface 11a (first surface) of the metal member 11 in the Z direction (first direction) is irradiated with the laser light L from a side opposite to the metal member 11 with respect to the plurality of metal foils 12 along the Z direction, in other words, in a direction opposite to the Z direction. As a result, the metal stacked body 10 in which the metal member 11 and the plurality of metal foils 12 are welded to each other via the welded portion 14 is obtained.

If the metal member 11 and all of the plurality of metal foils 12 are welded to each other by the laser light L emitted to the metal member 11, a melted region (melted pool) forming the welded portion 14 needs to penetrate all of the plurality of metal foils 12 from the metal member 11. In this case, in a case where an output of the laser light L is too small, the welded portion 14 does not reach the metal foil 12 far from the metal member 11, and the metal foil 12 is not joined in some cases. Conversely, in a case where the output of the laser light L is too large, welding defects may occur, for example, the metal foil 12 far from the metal member 11 may be broken. In this regard, according to the configuration and the method of the present embodiment, since the welded portion 14 is formed by irradiating the metal foils 12 with the laser light L from a side opposite to the metal member 11 as described above, it is possible to more easily form the welded portion 14 that penetrates the plurality of metal foils 12 and reaches the metal member 11, and it is possible to avoid the above-described inconvenient event that occurs when the metal member 11 is irradiated with the laser light L. In addition, in a case where a keyhole type melted state occurs in the layers of the plurality of metal foils 12 from the beginning of laser light irradiation, welding defects such as blowholes of the metal foils 12 may occur. In this regard, in the present embodiment, since a thermally conductive melted state due to functions of the second laser light is obtained in the layers of the plurality of metal foils 12 from the beginning of irradiation of the plurality of metal foils 12 with the laser light, welding defects such as blowholes of the metal foils 12 can be avoided.

In addition, in the present embodiment, for example, the second laser light has a wavelength of 400 [nm] or more and 500 [nm] or less.

According to such a configuration and method, for example, it is possible to obtain the higher quality metal stacked body 10 having less or no spatter and having no blowhole of the metal foils 12.

In addition, in the present embodiment, for example, at least a part of the beam B2 (second spot) of the second laser light is located ahead of the beam B1 (first spot) of the first laser light in the sweep direction SD on the front surface Wa.

In addition, in the present embodiment, for example, the beam B1 and the beam B2 at least partially overlap with each other on the front surface Wa.

In addition, in the present embodiment, for example, the beam B2 is wider than the beam B1 on the front surface Wa.

In addition, in the present embodiment, for example, the outer edge B2a (second outer edge) of the beam B2 surrounds the outer edge B1a (first outer edge) of the beam B1 on the front surface Wa.

As described above, the inventors have confirmed that spatters and blowholes can be further reduced in welding by irradiation with a beam of the laser light L forming such beams B1 and B2 on the front surface Wa. As described above, it can be estimated that this is because a melted pool of the workpiece W formed by the beam B2 and the beam B1 is further stabilized by heating the workpiece W in advance by the region B2f of the beam B2 before the beam B1 arrives. Therefore, according to the laser light L having such beams B1 and B2, for example, higher quality welding with less spatters and blowholes can be executed. In addition, according to setting of such beams B1 and B2, for example, an advantage that power of the first laser light can be further lowered can also be obtained. In addition, in a case where the beam B1 and the beam B2 are emitted coaxially, an advantage that relative rotation between the optical head 120 and the workpiece W is unnecessary can also be obtained.

In addition, in the present embodiment, for example, a ratio of the effective energy density $E_1$ (first energy density) of the first laser light on the front surface Wa to the effective energy density $E_2$ (second energy density) of the second laser light on the front surface Wa (second surface) is 1 or more and 10 or less.

According to such a configuration and method, for example, the higher quality metal stacked body 10 can be obtained.

In addition, in the present embodiment, for example, the workpiece W is made of any of a copper-based metal material, an aluminum-based metal material, a nickel-based metal material, an iron-based metal material, and a titanium-based metal material.

The effect of the welding method of the present embodiment is obtained in a case where the workpiece W is made of any of the above materials.

Second Embodiment

Figure 12:
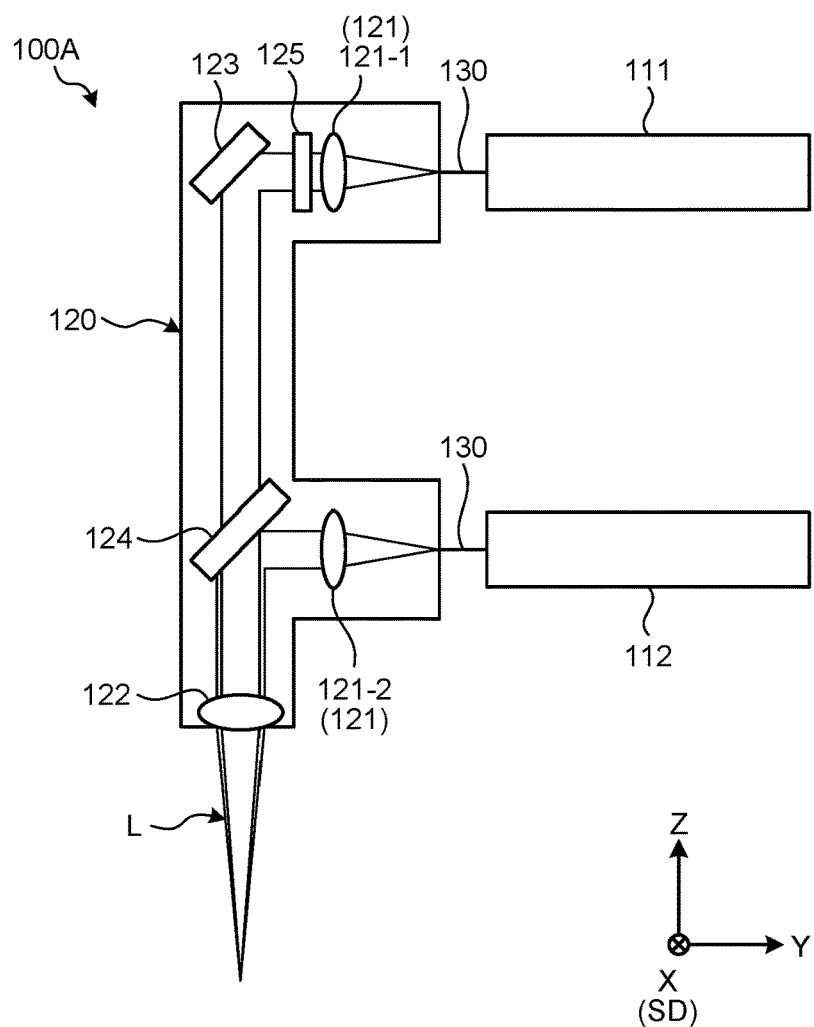
FIG. 12 is an exemplary schematic configuration diagram of a laser welding device of a second embodiment.

FIG. 12 is a schematic configuration diagram of a laser welding device 100A of a second embodiment. In the present embodiment, an optical head 120 includes a DOE 125 between a collimator lens 121-1 and a mirror 123. Except for this point, the laser welding device 100A has a configuration similar to the laser welding device 100 of the first embodiment.

Figure 13:
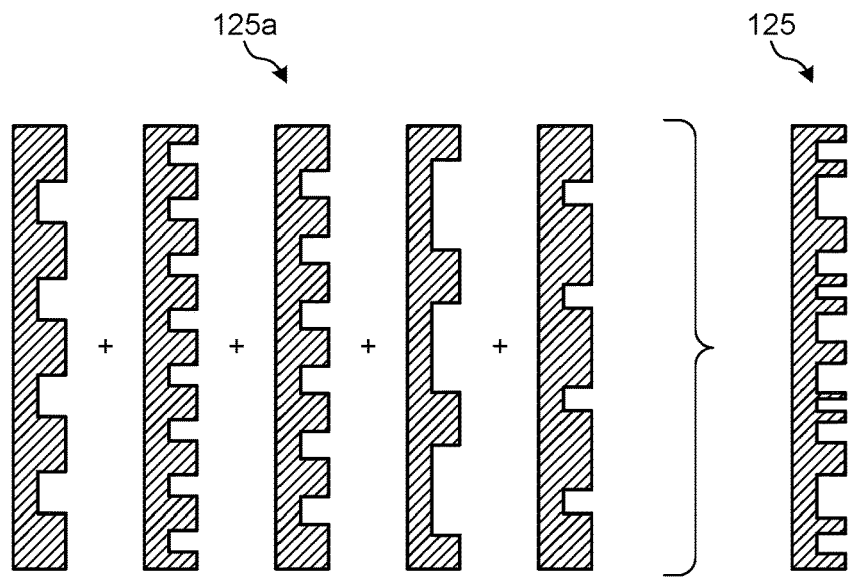
FIG. 13 is an explanatory diagram illustrating a concept of a principle of a diffractive optical element included in the laser welding device of the second embodiment.

The DOE 125 shapes the shape of a beam B1 of first laser light (hereinafter, referred to as a beam shape). As conceptually illustrated in FIG. 13, the DOE 125 has, for example, a configuration in which a plurality of diffraction gratings 125a having different periods is superimposed. The DOE 125 can shape a beam shape by bending parallel light in a direction influenced by each diffraction grating 125a or superimposing parallel light. The DOE 125 can also be referred to as a beam shaper.

Note that the optical head 120 may include a beam shaper that is disposed at a subsequent stage of a collimator lens 121-2 and adjusts the beam shape of second laser light, a beam shaper that is disposed at a subsequent stage of a filter 124 and adjusts the beam shapes of the first laser light and the second laser light, and the like. By appropriately adjusting the beam shape of laser light L by the beam shaper, it is possible to further suppress generation of spatters and blowholes in welding.

Third Embodiment

Figure 14:
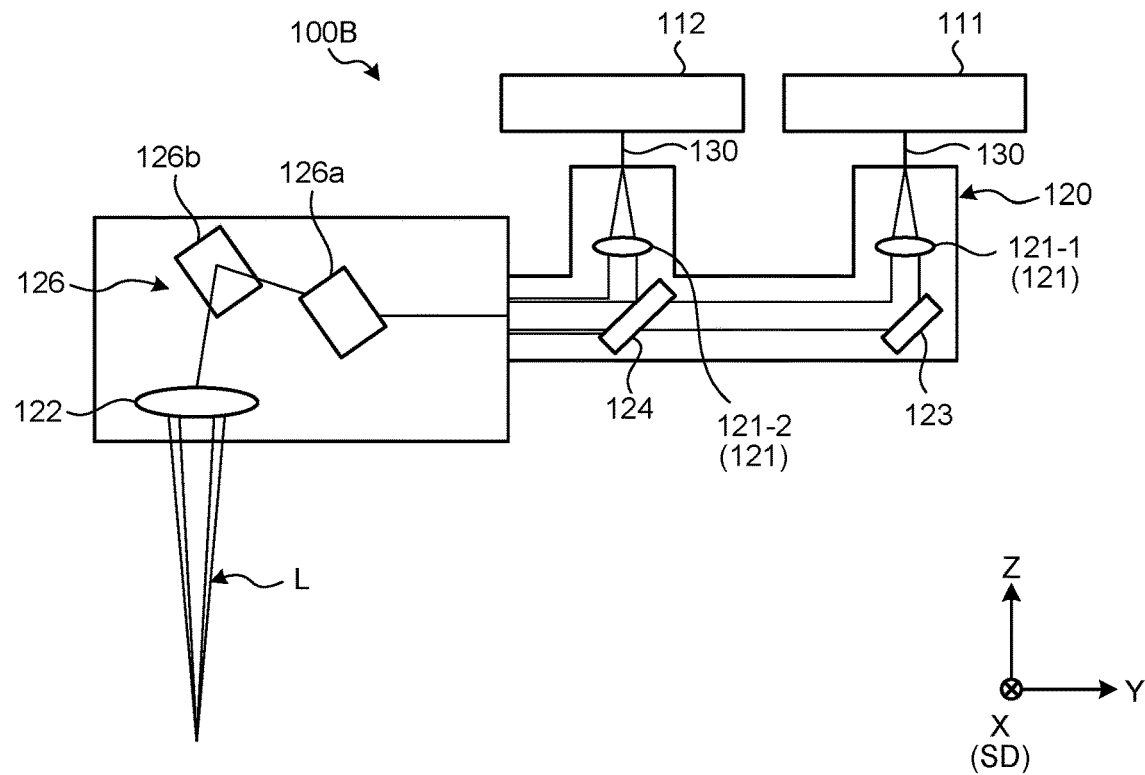
FIG. 14 is an exemplary schematic configuration diagram of a laser welding device of a third embodiment.

FIG. 14 is a schematic configuration diagram of a laser welding device 100B of a third embodiment. In the present embodiment, an optical head 120 includes a galvano scanner 126 between a filter 124 and a condenser lens 122. Except for this point, the laser welding device 100B has a configuration similar to the laser welding device 100 of the first embodiment.

The galvano scanner 126 includes two mirrors 126a and 126b, and is a device that moves an irradiation position of laser light L without moving the optical head 120 and can sweep the laser light L by controlling angles of the two mirrors 126a and 126b. The angle of each of the mirrors 126a and 126b is changed by, for example, a motor (not illustrated). According to such a configuration, a mechanism that relatively moves the optical head 120 and a workpiece W is unnecessary, and for example, an advantage that a device configuration can be downsized can be obtained.

Fourth Embodiment

Figure 15:
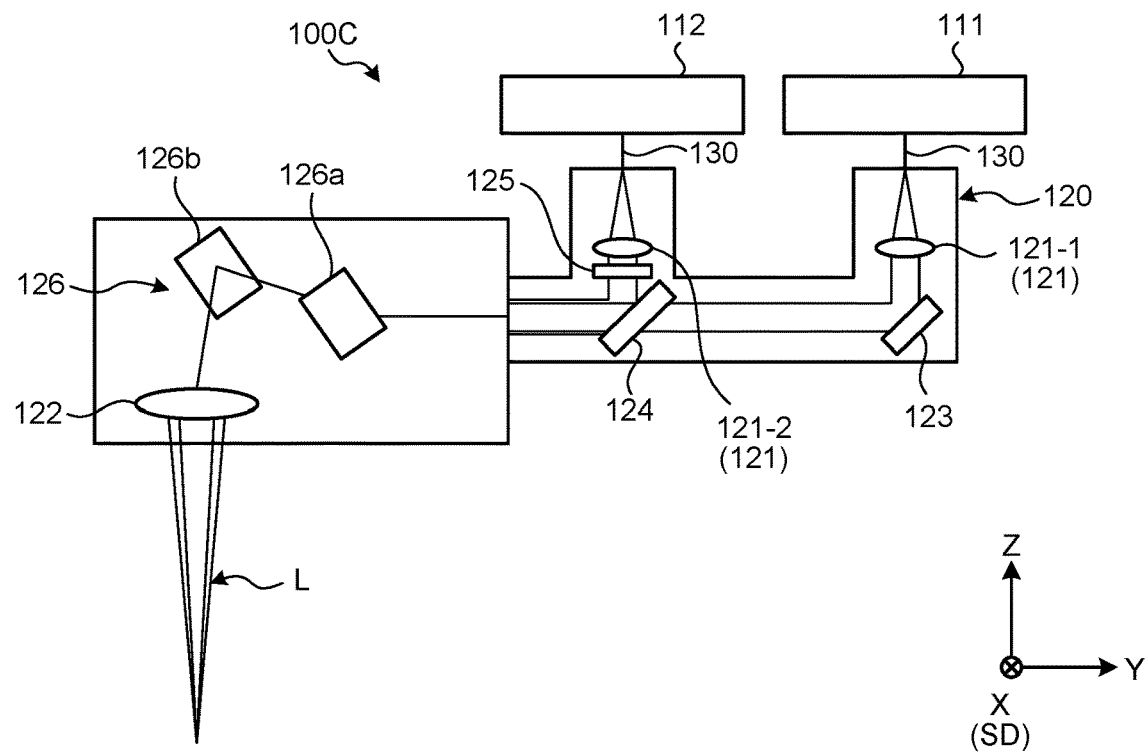
FIG. 15 is an exemplary schematic configuration diagram of a laser welding device of a fourth embodiment.

FIG. 15 is a schematic configuration diagram of a laser welding device 100C of a fourth embodiment. In the present embodiment, an optical head 120 includes a DOE 125 (beam shaper) between a collimator lens 121-2 and a filter 124. Except for this point, the laser welding device 100C has a configuration similar to the laser welding device 100B of the third embodiment. According to such a configuration, an effect similar to that of the third embodiment can be obtained by including the galvano scanner 126, and an effect similar to that of the second embodiment can be obtained by including the DOE 125 (beam shaper).

Note that, also in the present embodiment, the optical head 120 may include a beam shaper that is disposed at a subsequent stage of a collimator lens 121-1 and adjusts the beam shape of first laser light, a beam shaper that is disposed at a subsequent stage of the filter 124 and adjusts the beam shapes of the first laser light and second laser light, and the like.

Fifth Embodiment

Figure 16:
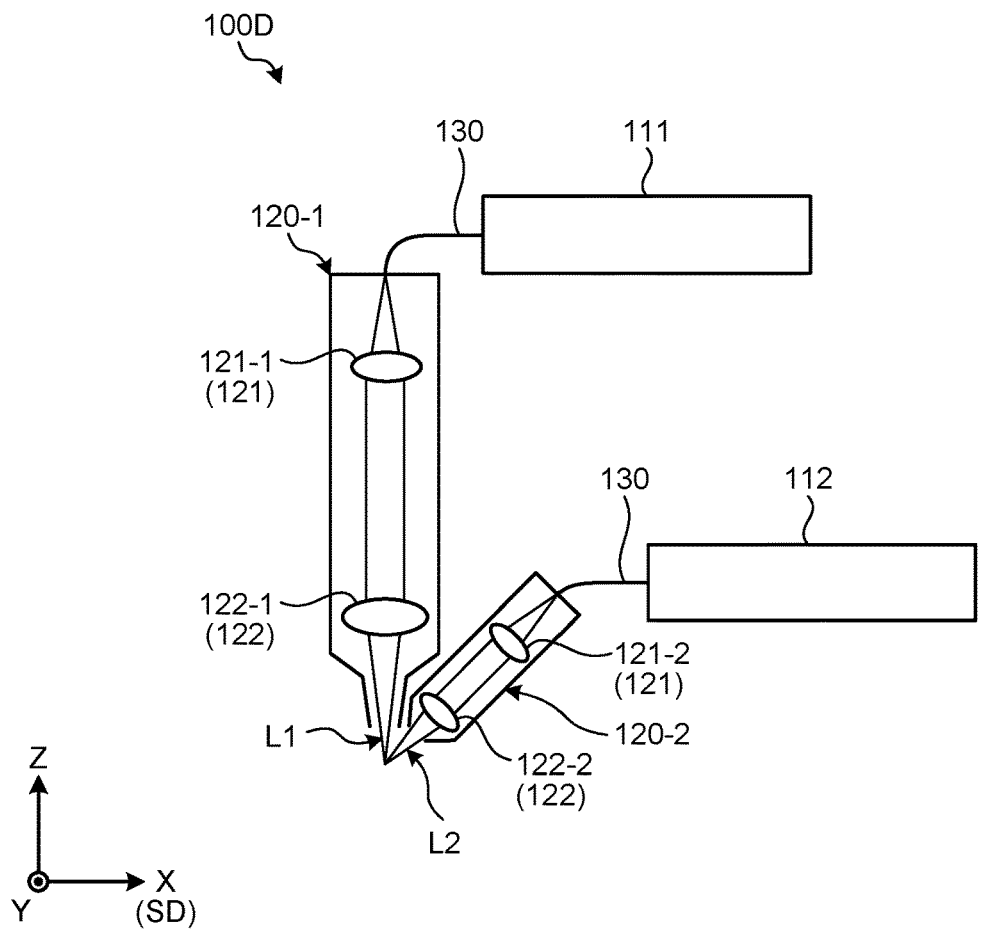
FIG. 16 is an exemplary schematic configuration diagram of a laser welding device of a fifth embodiment.

FIG. 16 is a schematic configuration diagram of a laser welding device 100D of a fifth embodiment. In the present embodiment, an optical head 120 includes a first portion 120-1 that emits first laser light L1 and a second portion 120-2 that emits second laser light L2, the first portion 120-1 and the second portion 120-2 being formed of different bodies (housings) Even with such a configuration, functions and effects similar to those of the above embodiments can be obtained.

Figure 17:
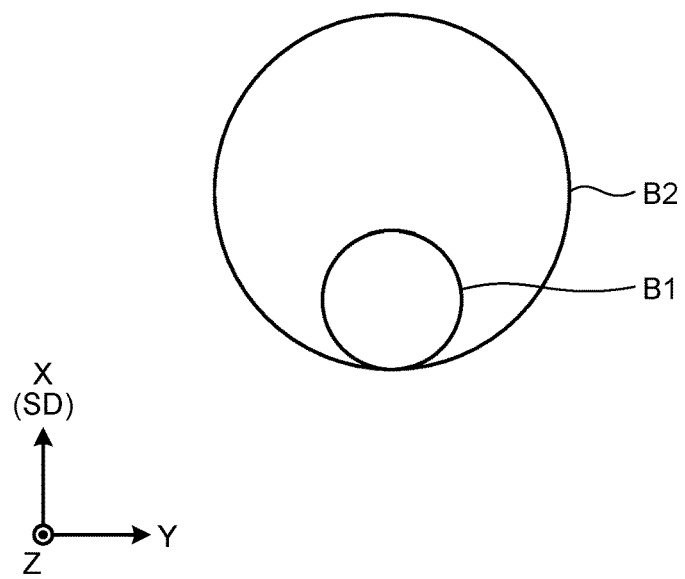
FIG. 17 is a schematic diagram illustrating an example of a beam (spot) of laser light formed on a surface of a workpiece by the laser welding device of the fifth embodiment.
Figure 18:
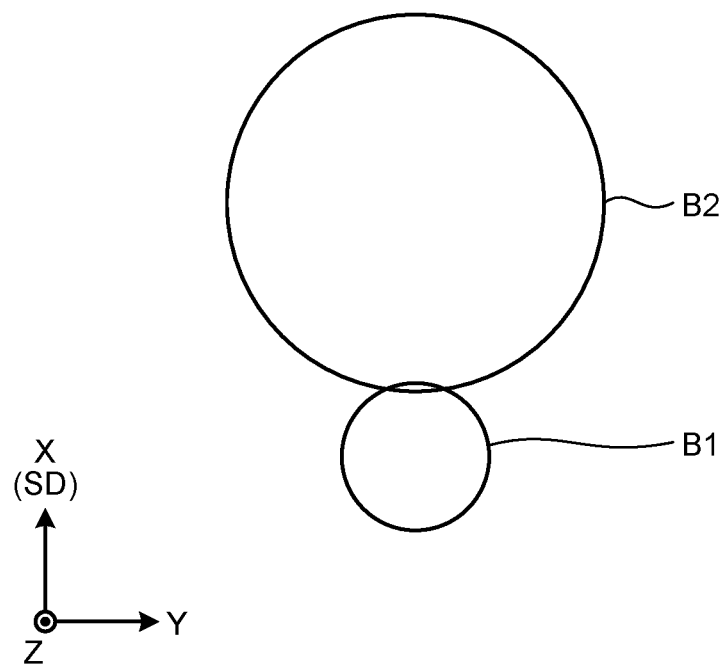
FIG. 18 is a schematic diagram illustrating an example of a beam (spot) of laser light formed on a surface of a workpiece by the laser welding device of the fifth embodiment.

FIGS. 17 and 18 illustrate examples of beams B1 and B2 of laser light formed on a front surface Wa by the laser welding device 100D. As illustrated in FIGS. 17 and 18, according to the laser welding device 100D, a relative position between the beams B1 and B2 can be arbitrarily set by setting a relative position between the first portion 120-1 and the second portion 120-2 and postures thereof. According to studies of the inventors, it has been found that, on the front surface Wa, as illustrated in FIGS. 17 and 18, in a case where at least a part of the beam B2 (second spot) is located ahead of the beam B1 (first spot) in the sweep direction SD, and in a case where the beam B1 and the beam B2 are in contact with each other or at least partially overlap with each other, effects similar to those of the first embodiment due to the preheating effect of the beam B2 can be obtained. In addition, in a case where at least a part of the beam B2 is located ahead of the beam B1 in the sweep direction SD, it has also been found that the beam B1 and the beam B2 may be separated from each other by a minute distance. Note that FIGS. 17 and 18 are merely examples, and the arrangement of the beams B1 and B2 obtained by the laser welding device 100D and the sizes of the beams B1 and B2 are not limited to the examples of FIGS. 17 and 18.

Although the embodiments of the present invention have been exemplified above, the above embodiments are merely examples, and are not intended to limit the scope of the invention. The above embodiments can be implemented in various other forms, and various omissions, substitutions, combinations, and changes can be made without departing from the gist of the invention. In addition, each configuration and specifications such as a shape (structure, type, direction, model, size, length, width, thickness, height, number, arrangement, position, material, and the like) can be appropriately changed to implement the above embodiments.

For example, the present invention is also applicable to a lithium ion battery cell having a configuration different from those of the above embodiments, and is also applicable to a battery other than the lithium ion battery cell. In addition, the battery is an example of an electrical product, and the electrical product of the present invention is not limited to the battery. In addition, a terminal of a battery is an example of an electrical component, and the electrical component of the present invention is not limited to the terminal of a battery.

In addition, when laser light is swept to a workpiece, a surface area of a melted pool may be adjusted by performing sweeping by known wobbling, weaving, output modulation, or the like.

In addition, laser light may be swept a plurality of times to a workpiece. In this case, [1] power of the laser light in a subsequent sweep may be made lower or higher than power of the laser light in the previous sweep, [2] a sweep speed in a subsequent sweep may be made faster or slower than a sweep speed in the previous sweep, or [3] power of the laser light in a subsequent sweep may be made higher than power of the laser light in the previous sweep, and a sweep speed in the subsequent sweep may be made faster than a sweep speed in the previous sweep.

In addition, the workpiece may have a thin layer of another metal on a surface of a metal, such as a plated metal plate.

According to the present invention, for example, it is possible to obtain a new and improved welding method and welding device capable of welding a stacked body in which a plurality of metal foils and a metal member are superimposed on each other, and a metal stacked body, an electrical component, and an electrical product welded by the welding method or the welding device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A welding method comprising:
   irradiating a plurality of metal foils stacked on a first surface of a metal member in a first direction with laser light to weld the metal member and the plurality of metal foils to each other to form a weld metal extending across the plurality of metal foils and the metal member,
   each of the metal member and the plurality of metal foils is made of any one of a copper-based metal material, an aluminum-based metal material, a nickel-based metal material, an iron-based metal material, or a titanium-based metal material,
   the laser light including first laser light having a wavelength of 800 [nm] or more and 1200 [nm] or less and second laser light having a wavelength of 550 [nm] or less,
   a second surface of a metal foil farthest from the metal member in the first direction among the plurality of metal foils, on a side opposite to the metal member, being irradiated with the laser light being swept on the second surface in a sweep direction,
   wherein a whole first intensity region having an intensity of $1/e^2$ or more of a peak intensity of the first laser light overlaps with a second intensity region having an intensity of $1/e^2$ or more of a peak intensity of the second laser light on the second surface, where e is the fundamental mathematical constant Euler's number,
   the second intensity region includes sub-regions that are not overlapped with the first intensity region, the sub-regions being located in front of and behind the first intensity region in the sweep direction of the laser light, and
   the welding method further includes:
   forming a second portion of the weld metal remaining inside the plurality of metal foils by performing thermally conductive melting to at least a part of the plurality of metal foils near the second surface by irradiation with the second laser light; and
   forming a first portion of the weld metal extending from a position adjacent to an opposite surface of the second surface with respect to the second portion to an inside of the metal material by performing keyhole type melting by irradiation with the first laser light.

2. The welding method according to claim 1, wherein the metal member has a thickness of 0.05 [mm] or more and 2.0 [mm] or less in the first direction, and layers of the plurality of metal foils have a thickness of 0.05 [mm] or more and 2.0 [mm] or less.

3. The welding method according to claim 1, wherein the second surface is irradiated with the laser light swept by wobbling, weaving, or output modulation.

4. The welding method according to claim 1, wherein the laser light is swept a plurality of times on the second surface.

5. The welding method according to claim 1, wherein the laser light is swept on the second surface, and a sweep speed is changed during sweeping on the second surface.

6. The welding method according to claim 1, wherein the laser light is swept on the second surface, and power of the laser light is changed during sweeping on the second surface.

7. The welding method according to claim 1, wherein the metal member is a plated metal plate.

8. The welding method according to claim 1, wherein a second spot is larger than a first spot on the second surface, the second spot being formed on the second surface by the second laser light, and the first spot being formed on the second surface by the first laser light.

9. The welding method according to claim 1, wherein the laser light is emitted to the second surface in a state in which a normal line direction of the second surface is substantially parallel to the first direction.

10. The welding method according to claim 1, wherein a shape of a second spot formed on the second surface by the second laser light has a point symmetrical shape with respect to a center of the second spot on the second surface.

11. The welding method according to claim 1, wherein the first laser light and the second laser light are emitted coaxially.

12. The welding method according to claim 1, wherein positions of a second spot formed on the second surface by the second laser light and a first spot formed on the second surface by the first laser light are substantially agreed with each other on the second surface.

13. The welding method according to claim 1, wherein positions of a second spot formed on the second surface by the second laser light and a first spot formed on the second surface by the first laser light are shifted to each other on the second surface.

* * * * *